(12) United States Patent
Sato

(10) Patent No.: US 6,415,380 B1
(45) Date of Patent: Jul. 2, 2002

(54) SPECULATIVE EXECUTION OF A LOAD INSTRUCTION BY ASSOCIATING THE LOAD INSTRUCTION WITH A PREVIOUSLY EXECUTED STORE INSTRUCTION

(75) Inventor: Toshinori Sato, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/237,900

(22) Filed: Jan. 27, 1999

(30) Foreign Application Priority Data

Jan. 28, 1998 (JP) .......................................... 10-016159

(51) Int. Cl.$^7$ .............................................. G06F 13/00

(52) U.S. Cl. ......................... 712/217; 711/137; 711/204

(58) Field of Search .......................... 712/217; 711/200, 711/202–204, 213, 137, 100, 3; 708/100, 200, 490, 550, 552, 553

(56) References Cited

U.S. PATENT DOCUMENTS

| 5,377,336 A | * 12/1994 | Eickemeyer et al. ........ 712/207 |
| 5,664,215 A | * 9/1997 | Burgess et al. ............... 712/23 |
| 5,822,788 A | * 10/1998 | Kahn et al. .................. 711/213 |
| 5,887,152 A | * 3/1999 | Tran ............................ 712/217 |
| 5,903,768 A | * 5/1999 | Sato ............................... 712/1 |
| 6,006,326 A | * 12/1999 | Panwar et al. ............... 712/217 |
| 6,175,898 B1 | * 1/2001 | Ahmed et al. ............... 711/137 |
| 6,216,200 B1 | * 4/2001 | Yeager ........................ 711/100 |

OTHER PUBLICATIONS

Moshovos, A., et al., "Dynamic Speculation and Synchronization of Data Dependences," Proceedings of the 24th Annual International Symposium on Computer Architecture, (1997).

Lipasti, M., et al., "Value Locality and Load Value Prediction," Proceedings of International Conference on Architectural Support for Programming Languages and Operating Systems, (1996).

Tomasula, R.M., "An Efficient Algorithm for Exploiting Multiple Arithmetic Units," IBM Journal of Research and Development, vol. 11, pp. 96–103, (1967).

Smith, J., et al., "Implementation of Precise Interrupts in Pipelined Processors," Proceedings of the 12th International Symposium on Computer Architecture, (1985).

* cited by examiner

Primary Examiner—Zarni Maung
Assistant Examiner—Wen-Tai Lin
(74) Attorney, Agent, or Firm—Foley & Lardner

(57) ABSTRACT

A processor having a data providing unit comprises a first table for holding the address of a store instruction indexed by a data address at which data value is stored by the store instruction, a second table for holding the address of the store instruction indexed by a subsequent load instruction, a data storing unit for holding data indexed by the address of the store instruction, and a data providing controller. The data providing controller retrieves the load instruction and the store instruction, both instructions looking up a same data address from the first and second tables, and retrieves data which are employed by the store instruction corresponding to the load instruction from the data storing unit, based on the address of the load instruction, and provides the data for the processor as predictive data to which access by the load instruction is predicted.

27 Claims, 17 Drawing Sheets

FIG.1
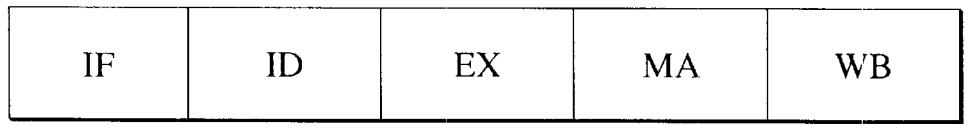
FIG.2A
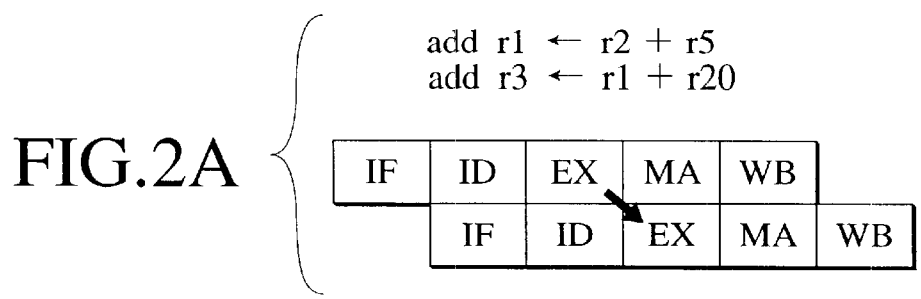
FIG.2B
FIG.3
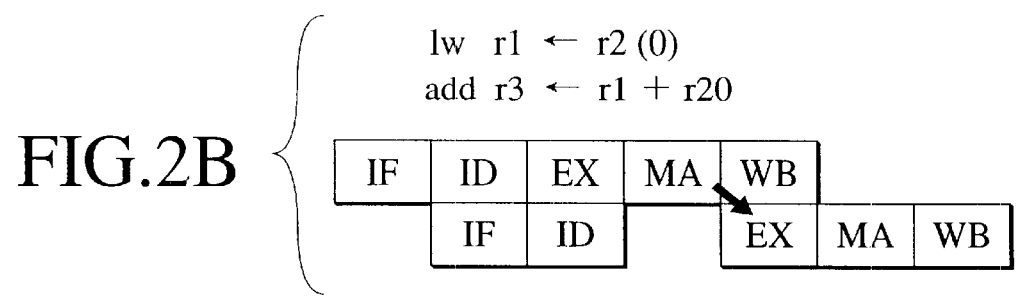

```
for ( i = 0 ; i < N ; + + i )
{
    ...
    store  r11 , r1 ( 0 ) ;
    r1 <- r1 + 4;
    ...
    load  r12 , r2 ( 0 ) ;
    r2 <- r2 + 2;
    ...
}
```

SPECULATIVE EXECUTION OF A LOAD INSTRUCTION BY ASSOCIATING THE LOAD INSTRUCTION WITH A PREVIOUSLY EXECUTED STORE INSTRUCTION

BACKGROUND OF THE INVENTION

1. Field of the Invention

The present invention relates to a data providing unit for processor and a processor having the data providing unit. More particularly, the present invention relates to a technology for improving a process efficiency of the processor by processing a load instruction at a high speed in a data providing unit which provides data to be read according to a load instruction to the processor.

2. Description of the Related Art

The technology for improving a process efficiency of the processor by using a pipeline process has been put to practical use. The "pipeline process" can be defined as such a scheme that a plurality of instructions are executed concurrently in parallel by shifting their processing stages by one cycle (i.e., pipeline pitch) sequentially.

FIG. 1 shows respective stages of standard five-stage pipeline in a RISC (Reduced Instruction Set Computer) type processor. As disclosed in a literature "Computer Architecture" (Hennessy et al.; Morgan Kaufmann Publishers, Inc.), etc., this type pipeline is a pipeline employed in a very basic processor.

In this pipeline process, one arithmetic instruction is divided into five stages and then executed. As shown in FIG. 1, these five stages are instruction fetch (IF) stage, instruction decode (ID) stage, execution (EX) stage, memory access (MA) stage, and write back (WB) stage. In the IF stage, an instruction is fetched from an instruction memory. In the ID stage, the instruction is interpreted, while an operand necessary for execution is fetched by accessing a register file. In the EX stage, an arithmetic operation is executed. In this case, when instructions (load instruction, store instruction, etc.) for accessing a data memory are executed, a data address is calculated in the EX stage. In the MA stage, the data memory is accessed and then data are fetched from the data memory by using the address which is calculated in the EX stage. In the WB stage, executed results and data read from the data memory are written back into a register file.

Next, an operation in the pipeline process when the load instruction is to be executed will be explained hereunder. For easy understanding, the operation in the pipeline process will be explained by using an example of a simple scalar processor which can execute only one instruction at a time.

FIGS. 2A and 2B show behaviors of the pipeline process when instructions are processed successively. As shown in FIG. 2A, when the preceding instruction is a standard arithmetic operation instruction (add instruction in FIG. 2A), it is possible to execute succeeding instructions successively. Arrows in FIGS. 2A and 2B indicate bypasses of arithmetic results. On the other hand, as shown in FIG. 2B, when the preceding instruction is a load instruction (Load Word (lw) instruction in FIG. 2B) to access the data memory, the situation is altered. In FIG. 2B, the load instruction is depicted as the Load Word (lw) instruction. The load instruction cannot acquire the data unless the MA stage is terminated. Therefore, the succeeding instruction (add instruction in FIG. 2B) cannot acquire the data necessary for operation until its own EX stage is started. In other words, the succeeding instruction (add instruction) must wait execution of the EX stage until execution of the load instruction has been completed. The execution of this load instruction contains two operations, i.e., the data address calculation and the memory access. Therefore, execution of a instruction which executes the process employing the result of the load instruction has a longer period of data dependency than the case where results of other operation are employed. This data dependency generates stall of the pipeline process so as to disturb improvement in processor performances.

Next, an operation in the pipeline process when the load instruction and the load instruction are to be executed successively will be explained hereunder. In this case, the operation will be explained by using an example of an out-of-order type processor in which dynamic rearrangement of the instructions can be attained at the time of execution of the instruction.

FIG. 3 shows an example of instruction sequences in which the store instruction and the load instruction are issued successively. In FIG. 3, the store instruction is depicted as Store Word (sw) instruction and the load instruction is depicted as Load Word (lw). In the instruction sequence in FIG. 3, assume that the value in a register r2 which calculates the address of the preceding store (sw) instruction is not determined, while the value in a register r3 which executes the address of the load (lw) instruction is determined. Assume that the values in registers r20, r21 which are operands of the add instruction are also determined. The sw instruction waits its execution because its operands have not been prepared. The add instruction can start execution to overtake the sw instruction because its operands have been prepared. It seems that the lw instruction can also start execution because its operands have been prepared, nevertheless actually the lw instruction cannot start execution because dependency of the lw instruction upon the sw instruction has not been dissolved. In other words, unless the data address into which data are to be stored by the preceding store instruction can be determined, the succeeding load instruction cannot be executed. This is because, if the data address calculated by the store instruction and the data address calculated by the load instruction coincide with each other, the load instruction must read out the data which the store instruction is trying to save. Therefore, the load instruction cannot be executed to overtake the store instruction which is in its standby even if these instructions employ different registers and their operands are prepared. For this reason, even in the case of the out-of-order type processor, overtaking of the instruction cannot be carried out and thus the stand-by time for the execution of the instruction is increased, so that performances of the processor cannot be improved. This problem in execution stand-by of the load instruction is also applicable for the above scalar processor.

The technology, which can improve a process efficiency of the load instruction by using the correspondence between the store instruction and the load instruction in successive execution, has been disclosed in "Dynamic Speculation and Synchronization of Data Dependence" ("Proceedings of the 24th Annual International Symposium on Computer Architecture", A. I. Moshovos, et al., 1997). In this technology, the correspondence between the store instruction and the load instruction which depend on particular data stored in the same memory address is held previously, and then such correspondence is checked in execution. If no correspondence between the store instruction and the load instruction is detected by this check, the load instruction can be executed not to wait for execution of the store instruction.

However, in this technology, if the correspondence between the store instruction and the load instruction is detected, i.e., if these instructions access the data stored in the same memory address, the load instruction stalls until execution of the store instruction has been completed, like the conventional scheme. Therefore, this technology has not be able to improve sufficiently an execution efficiency of the load instruction.

As discussed above, there have been following problems in the conventional scheme.

More particularly, first, there has been the problems that a process efficiency of the load instruction is low and also the succeeding load instruction cannot be executed unless the preceding store instruction is executed. Since execution of the load instruction needs two operations such as the address calculation and the memory access, a dependency path between the load instruction and other instructions becomes longer than other instructions.

Second, there has been the problem that, when there is the correspondence of the data stored at the same address between the store instruction and the load instruction, the load instruction cannot be executed after the address calculation of the data to be accessed has been executed.

These problems have reduced a degree of parallel processing in the pipeline process, so that disturb extraction of instruction level parallelism. For this reason, these problems have brought about such a disadvantage that execution performances of the processor are extremely degraded.

SUMMARY OF THE INVENTION

The present invention has been made in light of the above problems and it is an object of the present invention to provide a data providing unit for processor which can execute data acquisition for load instructions predictivelly to execute succeeding instructions speculatively, so as to improve performances of a processor.

It is another object of the present invention to provide a data providing unit for processor which can improve a degree of parallel processing in a pipeline process by reducing a data dependency period between a store instruction and a load instruction in case the store instruction and the load instruction are executed successively.

In order to achieve the above objects, a feature of the present invention resides in that correspondences between the store instruction and the load instruction are held previously as history data of past instructions and then data corresponding to the data are provided to the processor as predictive data.

A configuration to achieve these functions comprises, as shown in FIG. 4, for example, a first address converter 100 for holding an address of a store instruction corresponding to address of data, based on execution history of the store instruction, a second address converter 200 for holding the address of the store instruction corresponding to an address of a load instruction, based on execution history of the load instruction, a data storing unit 300 for holding data corresponding to the address of the store instruction, based on execution history of the store instruction, and a data providing controller 700 for retrieving the load instruction and the store instruction, both instructions looking up a same data address, from the first address converter 100 and the second address converter 200, retrieving data which are employed by the store instruction corresponding to the load instruction from the data storing unit 300, based on the address of the load instruction, and providing the data for the processor as predictive data to which access by the load instruction is predicted.

The history data of the above instructions can be implemented in two above address converters and the data storing unit, for example.

The data providing controller 700 can acquire the address of the store instruction corresponding to the load instruction by looking up the LIST (Load Index Storing Table) 200 (referred to as the second address converter in claims described later) by using the address of the load instruction when the load instruction is executed. The data providing controller 700 can acquire data values corresponding to the store instruction by looking up the SIVT (Store Index Value Table) 300 (referred to as the data storing unit in claims) by using the address of the store instruction. Resultant data are provided for the processor as predictive data.

In other words, data values to be accessed are predicted according to the instruction address of the load instruction and then such data are provided for the processor as the predictive data. Therefore, the load instruction can acquire the data before calculation of the data address has been completed. Consequently, execution of the load instruction is accelerated, and also process performances of the processor can be improved by executing succeeding instructions speculatively by using the predictive data.

In addition, the data providing controller 700 can detect the correspondence between the store instruction and the load instruction without intervention of the data address. Therefore, the data providing controller 700 can improve the process performance of the processor by executing the store instruction and the load instruction simultaneously or executing overtaking of the store instruction by the load instruction.

As shown in FIG. 4, the configuration according to the present invention can further comprises a state holding unit 400 and a comparator 500.

The state holding unit 400 can hold the state of the processor before the processor looks up the data providing unit according to the present invention. This state of the processor contains at least values of the program counter 600 and respective registers. The comparator 500 can compare the predictive data with actual data value obtained by accessing the memory actually, so as to output the compared result.

The data providing controller 700 can restore the processor by using the state being held by the state holding unit 400 unless the compared result coincides with each other. Accordingly, it is possible to keep consistency in the process by using the compared result.

History of the compared result can be held in the tables, e.g., LIST 200, etc. counters, for example. The data providing controller 700 can suppress the inadvertent speculative execution which has a low coincidence rate by looking up the counter value. Accordingly, reduction in process performances of the processor owing to the failure of speculative execution and restoring to the original state can be suppressed.

In addition, address of the data may be held in the LIST 200, etc. in the above tables, for example. The data providing controller 700 can get predictive data address quickly by looking this the address of the data. Therefore, the speculative execution can be started quickly.

Further, address of the data may be held in the SIVT 300, etc. in the above tables, for example. The data providing controller 700 can decide quickly the success or failure of the speculative execution using the predictive data. Accordingly, restoration of the state can be executed quickly if the speculative execution has been done unsuccessfully.

Also, it is preferable that the data providing controller 700 looks up the second address converter 200 and the data storing unit 300 in different pipeline stages respectively. By looking up them in different pipeline stages, a cycle time of the processor can be avoided from being extended.

Various further and more specific objects, features and advantages of the invention will appear from the description given below, taken in connection with the accompanying drawings illustrating by way of example a preferred embodiments of the invention.

BRIEF DESCRIPTION OF THE DRAWINGS

FIG. 1 is a diagram showing respective stages of five-stage pipeline in a pipeline process;

FIGS. 2A and 2B are diagrams showing generation of data hazard in the pipeline process of a load instruction;

FIG. 3 is a sequential diagram showing hazard due to latent collision of data addresses when a store instruction and a load instruction are issued successively;

DETAILED DESCRIPTION OF THE PREFERRED EMBODIMENTS

Respective data providing units for processor according to embodiments of the present invention will be explained in detail with reference to the accompanying drawings hereinafter.

First Embodiment

A first embodiment predicts a value which is to be read from a memory by a load instruction serving as a data transfer instruction, by referring to the past history accumulated until now before data address calculation is completed. The first embodiment provides a function of executing succeeding instructions speculatively by using this predicted value.

Figure 4:
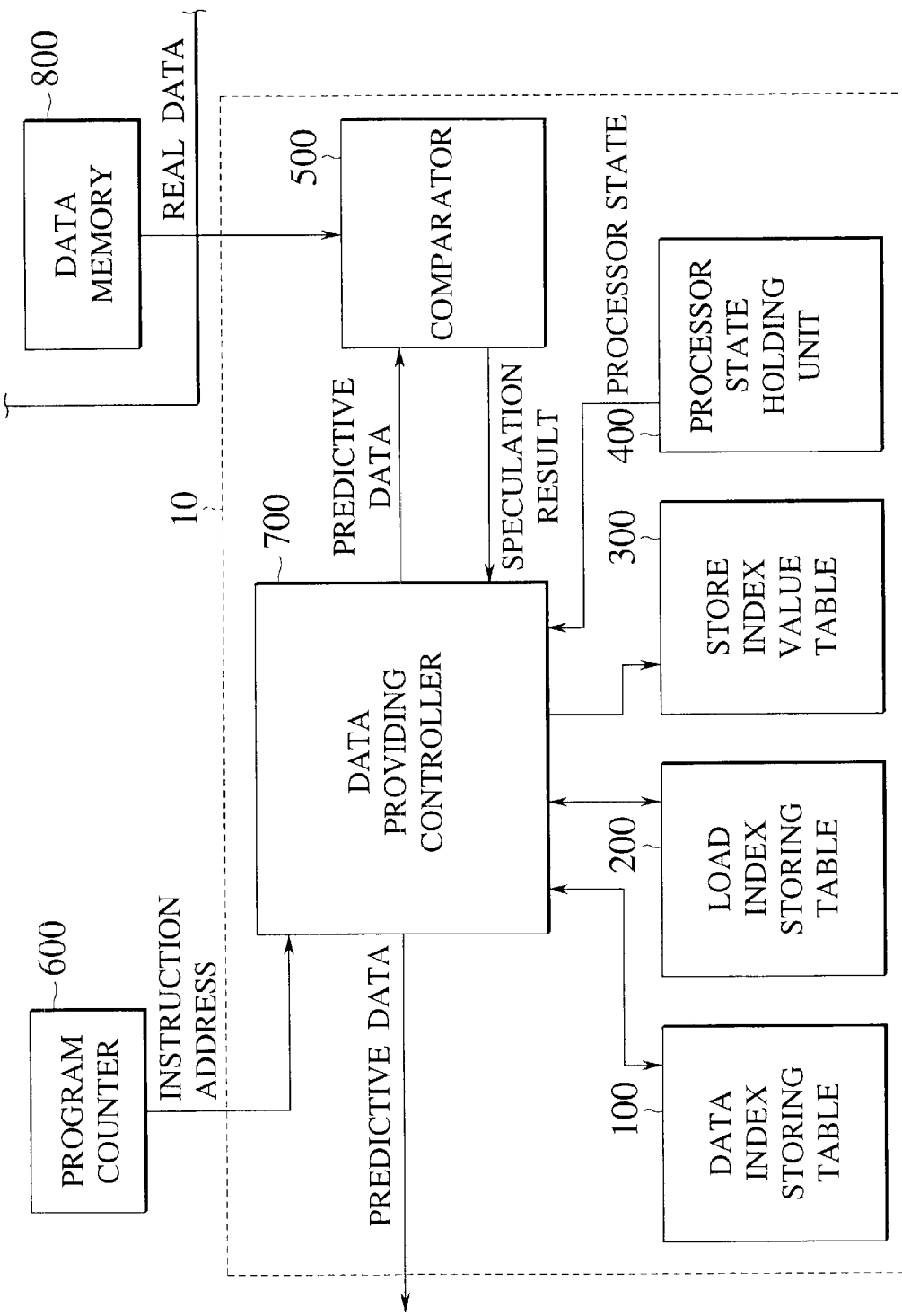
FIG. 4 is a block diagram showing a configuration of a data providing unit according to an embodiment of the present invention and predicting operation of data to be loaded.

FIG. 4 is a block diagram showing a configuration of a data providing unit for a processor according to a first embodiment of the present invention. As shown in FIG. 4, a data providing unit 10 of a processor according to the first embodiment comprises a DIST (Data Index Storing Table) 100 for storing correspondences between data addresses to be accessed and instruction addresses of store instructions, a LIST (Load Index Storing Table) 200 for storing correspondences between instruction addresses of the load instructions and instruction addresses of the store instructions, a SIVT (Store Index Value Table) 300 for storing correspondences between the instruction addresses of the store instructions and data values, a processor state holding unit 400 for holding states of the processor before the data providing unit 10 provides predictive data to the processor using a circuit such as latch, a comparator 500 for comparing the predictive data with data which can be fetched by actually accessing the memory, to thus output the compared result, so as to a data providing controller 700 for providing the predictive data which can be obtained by accessing above respective tables for the processor.

Figure 5:
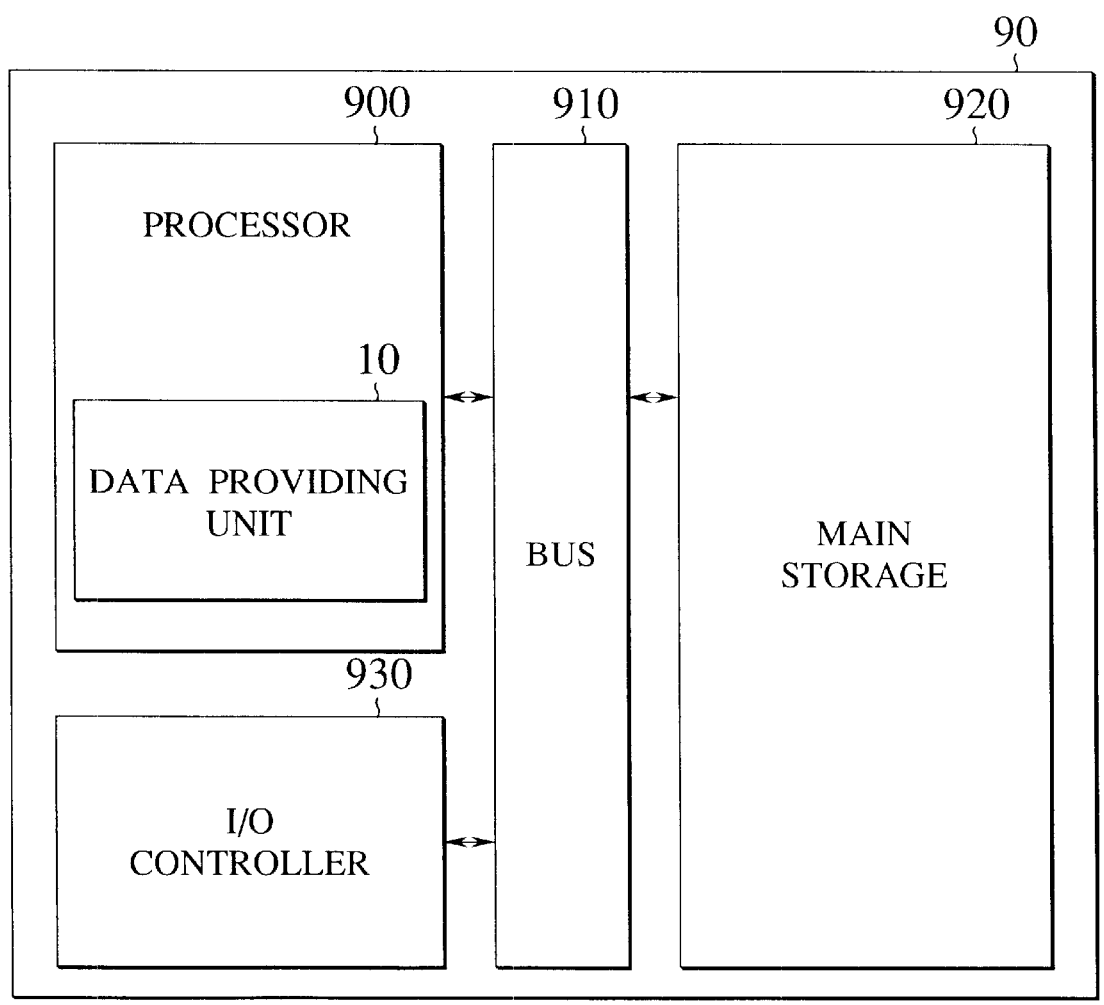
FIG. 5 is a block diagram showing relationships the data providing unit according to an embodiment of the present invention, a processor, and a computer.

The data providing unit 10 according to the first embodiment provides data for the processor having a standard configuration, for example. FIG. 5 shows an example of the processor having the standard configuration. Normally the data providing unit 10 according to the first embodiment is installed in a processor (CPU) 900. When data transfer instructions such as the load instruction and the store instruction are issued, the processor 900 accesses data stored in a main memory 920 via a bus 910. The processor 900, if necessary, inputs/outputs data, arithmetic results, etc. from/to an external device via an I/O controller 930 through the bus 910. In response to the issuance of the load instruction and the store instruction, the data providing unit 10 provides data values in history data stored in the tables for the processor 900 as the predictive data.

The contents of three above tables containing the history data will be explained in detail hereinafter.

These tables are constructed similarly to a cache memory. In the first embodiment, respective tables will be explained under the assumption that they are constructed as the direct map system of an associativity 1. However, no restriction is imposed on the associativity of the tables in the first embodiment, and thus any value may be adopted as the associativity. The tables may be constructed according to the associative system. The term "associativity" means the number of blocks which can be installed in the cache. An entry of the block is composed of a tag field employed to index respective blocks and a data field.

First, the DIST 100 which indexed by the data address, and which holds the instruction address of the store instruction which has accessed to the address. The DIST 100 corresponds to a first address converter set forth in claims.

Figure 6:
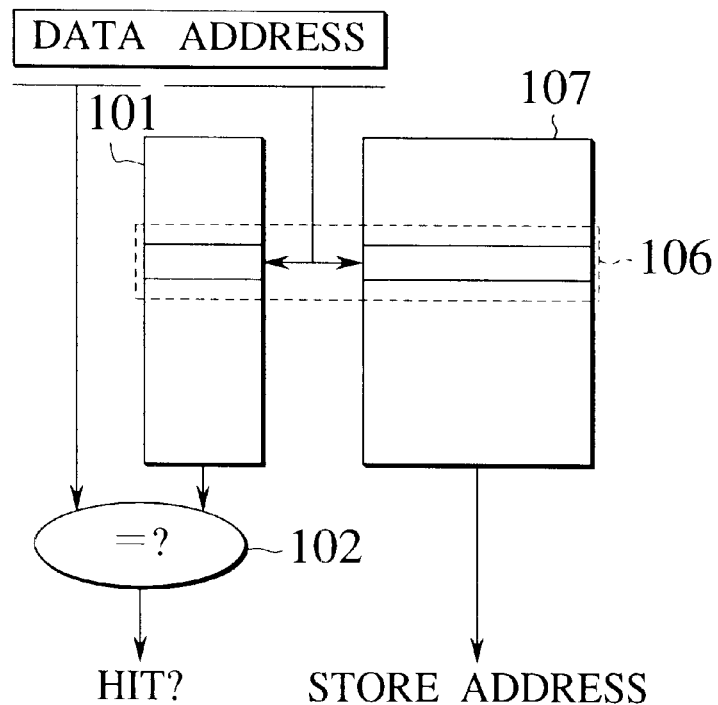
FIG. 6 is a block diagram showing a configuration of DIST (Data Index Storing Table) in the data providing unit according to a first embodiment of the present invention.

FIG. 6 shows a configuration of the DIST 100. In FIG. 6, the DIST 100 comprises a tag array 101, a data array 107, and a comparator 102. A data providing controller 700 selects a particular entry 106 of the DIST 100 by using data addresses. The comparator 102 compares a tag fetched from the tag array 101 with an upper bit of the data address. If the tag and the upper bit coincide with each other, the store instruction address fetched from the data array 107 is regarded to be valid.

Figure 7:
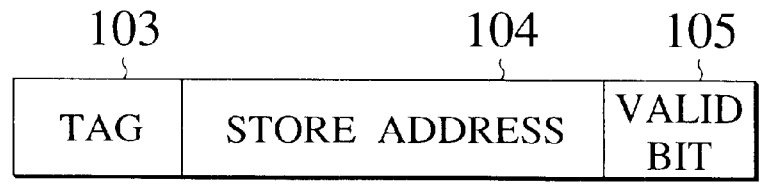
FIG. 7 is a diagram showing respective fields in entry of DIST in FIG. 6.

FIG. 7 shows the entry 106 of the DIST 100 in FIG. 6. In FIG. 7, each entry 106 comprises: a tag field 103; an instruction address field 104 for the store instruction; and a valid bit 105. Each entry in the DIST 100 is selected by lower bits of the data address whose number correspond to the number of entry of the data address. The number of entry of the table can be decided appropriately with regard to a capacity of the cache and a desired process efficiency. The bit number which is enough to represent all decided entries can be employed in selection. Remaining upper bits of the data address are saved in the tag field 103. If the content of the tag field 103 being saved in the selected entry 106 and the upper bit of the data address coincide with each other when they are compared, the store instruction address corresponding to the data address is saved. The address of the instruction which store the data before in the data address employed as the index is held in the store instruction address field 104. The valid bit 105 represents whether or not the entry 106 is valid. When the processor is started, all valid bits 105 represent the value indicating being invalid as its initial value. When the data are saved in respective entries 106 of the DIST 100, the valid bit 105 is set to valid.

Second, the LIST 200 which indexed by the instruction address of the load instruction, and which holds the instruction address of the store instruction corresponding to the load instruction. The LIST 200 corresponds to a second address converter set forth in claims.

Figure 8:
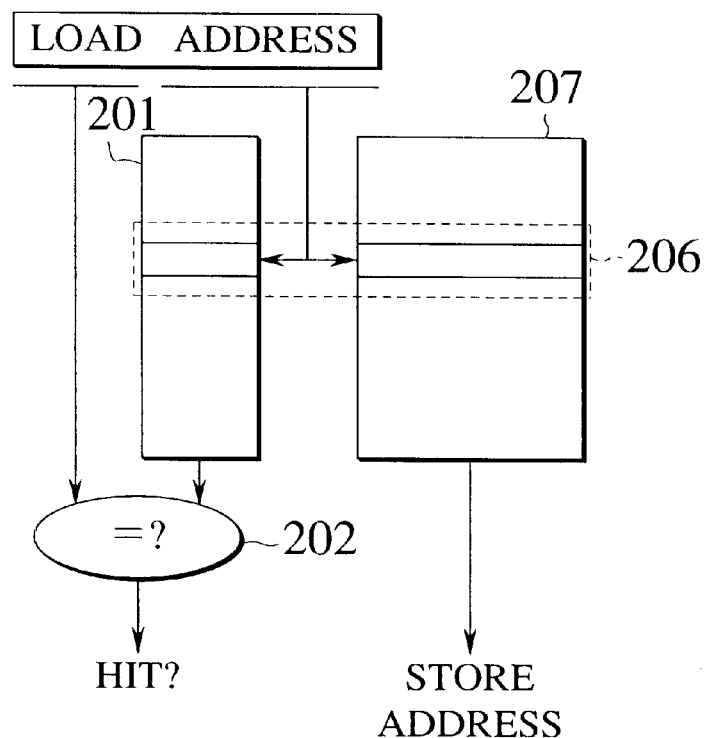
FIG. 8 is a diagram showing a configuration of LIST (Load Index Storing Table) in the processor data providing unit according to the first embodiment of the present invention.

FIG. 8 shows a configuration of the LIST 200. In FIG. 8, the LIST 200 comprises: a tag array 201; a data array 207; and a comparator 202. The data providing controller 700 selects a particular entry 206 of the LIST 200 by using the load instruction address. The comparator 202 compares the tag fetched from the tag array 201 with the upper bit of the load instruction address. If they coincides with each other, the store instruction address fetched from the data array 207 is regarded to be valid.

Figure 9:
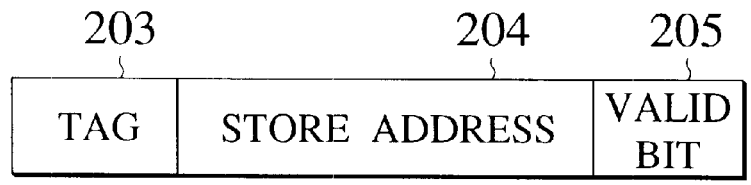
FIG. 9 is a diagram showing respective fields in an entry of LIST in FIG. 8.

FIG. 9 shows an entry 206 of the LIST 200 in FIG. 8. In FIG. 9, the entry 206 comprises: a tag field 203; an instruction address field of the store instruction 204; and a valid bit 205. Each entry in the LIST 200 is selected by the lower bits of the load instruction address whose number correspond to the number of entry of the instruction address of the load instruction. Remaining upper bits of the load instruction address are saved in the tag field 203. If the content of the tag field 203 being saved in the selected entry 206 and the upper bit of the data address coincide with each other when they are compared, the store instruction address corresponding to the load instruction address is saved. The address of the store instruction which previously stores the data to be looked up by the given load instruction is held in the store instruction address field 204. The valid bit 205 represents whether or not the entry 206 is valid. When the processor is started, all the valid bits 205 represent the value indicating being invalid as its initial value. When the data are saved in respective entries 206 of the LIST 200, the valid bit 205 is set to valid.

Third, the SIVT 300 which indexed by the instruction address of the store instruction, and which holds data values stored by the store instruction. The SIVT 300 corresponds to a data storing unit set forth in claims.

Figure 10:
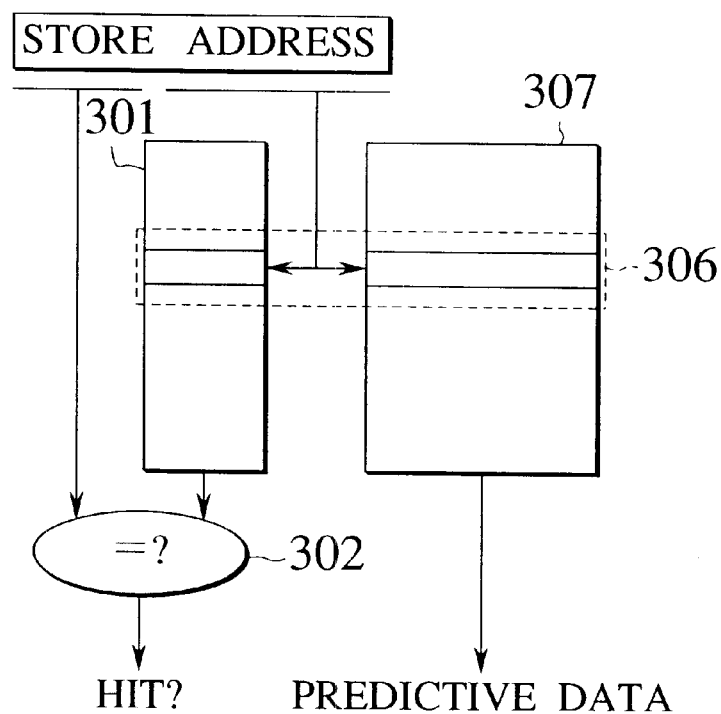
FIG. 10 is a block diagram showing a configuration of SIVT (Store Index Value Table) in the data providing unit according to the first embodiment of the present invention.

FIG. 10 shows a configuration of the SIVT 300. In FIG. 10, the SIVT 300 comprises a tag array 301, a data array 307, and a comparator 302. The data providing controller 700 selects a particular entry 306 of the SIVT 300 by using the store instruction address. The comparator 302 compares the tag fetched from the tag array 301 with the upper bit of the store instruction address. If they coincides with each other, the store instruction address fetched from the data array 307 is regarded to be valid.

Figure 11:
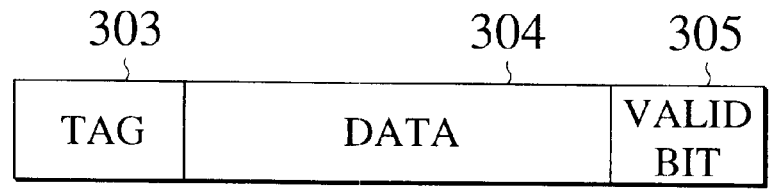
FIG. 11 is a diagram showing respective fields in entry of SIVT in FIG. 10.

FIG. 11 shows an entry 306 of the SIVT 300 in FIG. 10. In FIG. 11, the entry 306 comprises a tag field 303, a data field 304, and a valid bit 305. Each entry in the SIVT 300 is selected by the lower bits of the store instruction address whose number correspond to the number of entry of the instruction address of the store instruction. Remaining upper bits of the store instruction address are saved in the tag field 303. If the content of the tag field 303 being saved in the selected entry 306 and the upper bit of the store instruction address coincide with each other when they are compared, the data corresponding to the store instruction address is saved. The data which are stored previously by the given store instruction is stored in the data field 304. The valid bit 305 represents whether or not the entry 306 is valid. When the processor is started, all the valid bits 305 represent the value indicating being invalid as its initial value. When the data are saved in respective entries 306 of the SIVT 300, the valid bit 305 is set to valid.

Next, an operation of the first embodiment along with a pipeline operation of the processor and operations of respective tables will be explained hereinbelow.

To begin with, outline of the operation of the first embodiment will be explained hereunder. In the first embodiment, the name of the data address is replaced with the instruction address of the store instruction in order to skip a time necessary for data address calculation. Further, the first embodiment makes it possible to replace the instruction address of the load instruction with the instruction address of the store instruction by correlating the load instruction with the store instruction, both instructions access the same data address. In the first embodiment, the data values which are stored by the store instruction previously can be obtained without access to the memory.

With the above operations, change from the load instruction address to the store instruction address, or change from the store instruction address to the data address can be achieved. As a result, the data to be read can be looked up without calculation of the data address using the load instruction address.

Next, a detailed operation of the first embodiment will be explained by classifying such operation into a table looking-up operation and a table registering operation.

(1) Table looking-up operation

At first, the table looking-up operation in instruction execution will be explained with reference to FIG. 12.

Figure 12:
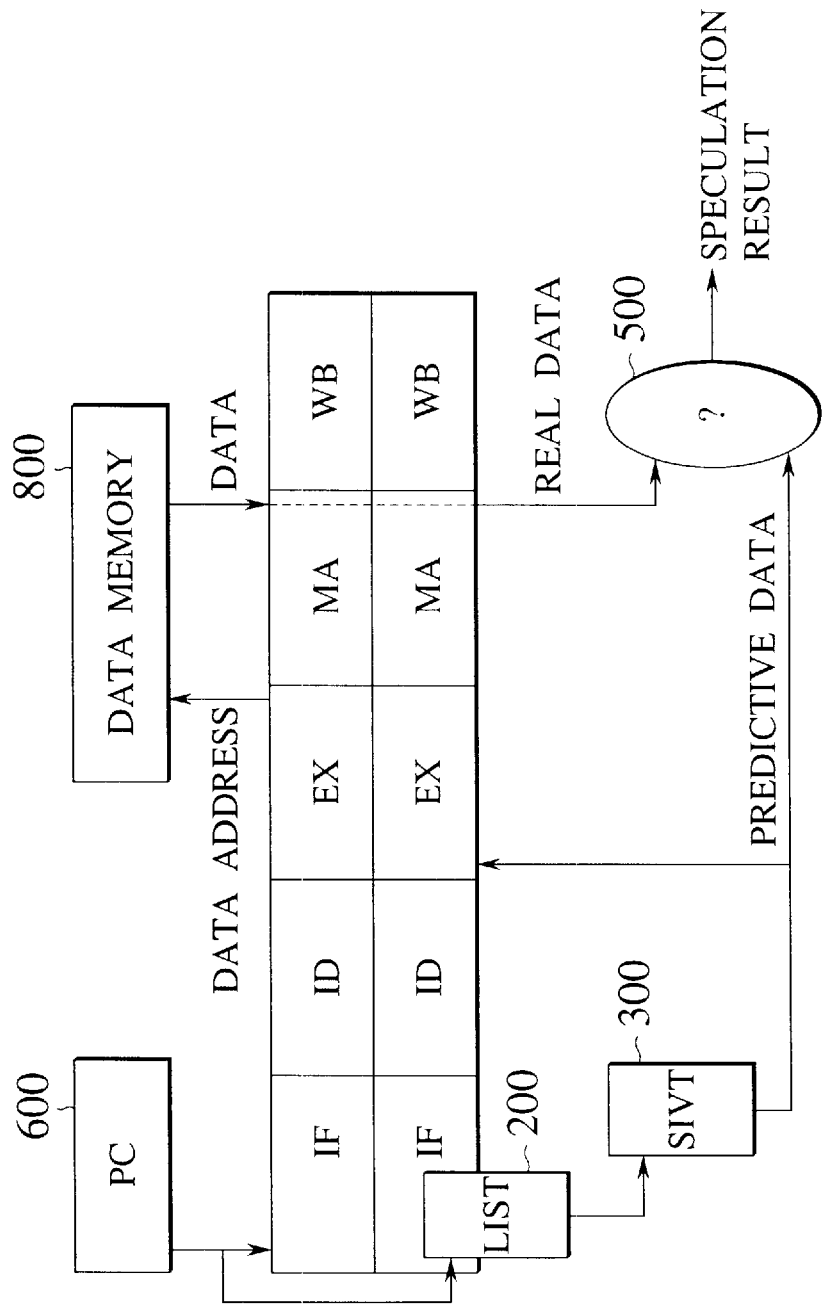
FIG. 12 is a diagram showing a predicting operation of data to be loaded in the data providing unit according to the first embodiment of the present invention in instruction execution.

As shown in FIG. 12, the data providing controller 700 accesses the LIST 200 in the IF stage by using the load instruction address indicated by a program counter (PC) 600. The data providing controller 700 accesses the SIVT 300 by using the store instruction address which can be fetched from the LIST 200. The data fetched from the SIVT 300 are provided for succeeding instructions as operands. The data providing controller 700 can provide the data obtained from the SIVT 300 as predictive data before calculation of the data address of the load instruction has been completed. Hence, execution of the succeeding instructions is in no means interrupted. In this manner, the succeeding instructions can be executed speculatively by using the data predicted from the LIST 200 and the SIVT 300. As shown in FIG. 12, access to the LIST 200 and the SIVT 300 can be executed not to wait until the instruction of the instruction address supplied from the PC 600 is decoded in the ID stage. When predictive data can be prepared by accessing the table in advance, a process efficiency can be further improved.

In the MA stage of the load instruction, real data can be fetched from a data memory 800. A comparator 500 compares the real data with the data (predictive data) being fetched from the SIVT 300. If both data coincide with each other, speculative execution is successful. Unless both data coincide with each other, speculative execution is unsuccessful. In the case of unsuccessful execution, the processor must restore the state before the speculative operation is started. In this restoration of the state, a publicly known device such as a reorder buffer, etc. which is employed for the speculative operation of the branch instruction can be employed. This reorder buffer is disclosed in, for example, "Implementation of Precise Interrupts in Pipelined Processors" ("Proceedings of the 12th International Symposium on Computer Architecture", J. E. Smith, et al., pp. 36–44, 1985).

(2) Table registering operation

Then, registering operations onto respective tables will be explained hereunder.

Figure 13:
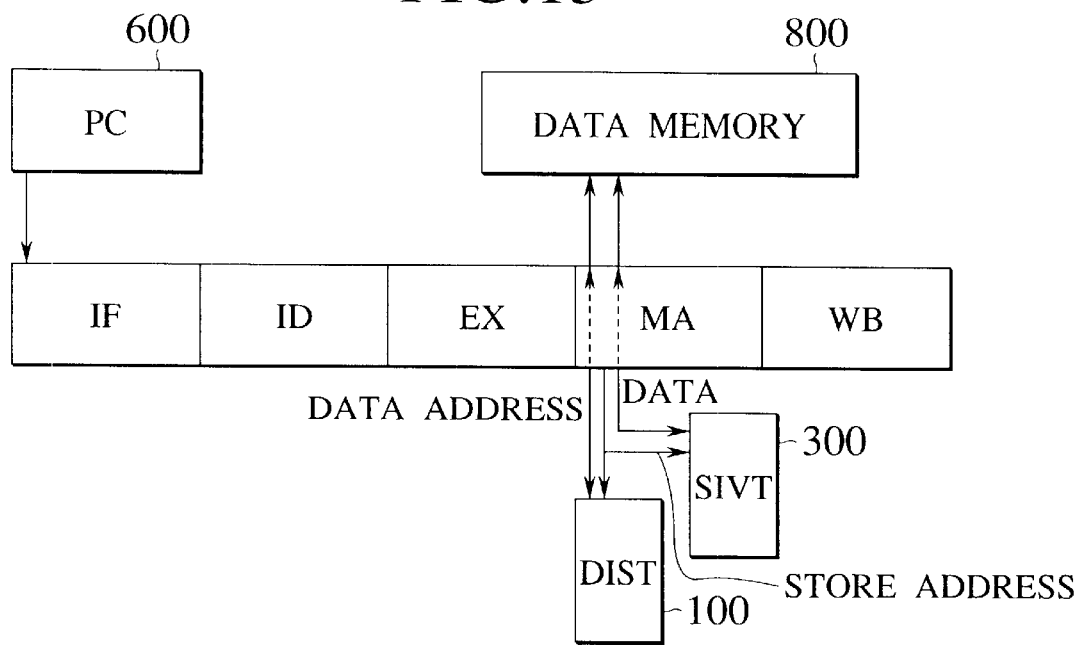
FIG. 13 is a diagram showing a registering operation onto DIST and SIVT of the data providing unit when the load instruction is executed for the first time.
Figure 14:
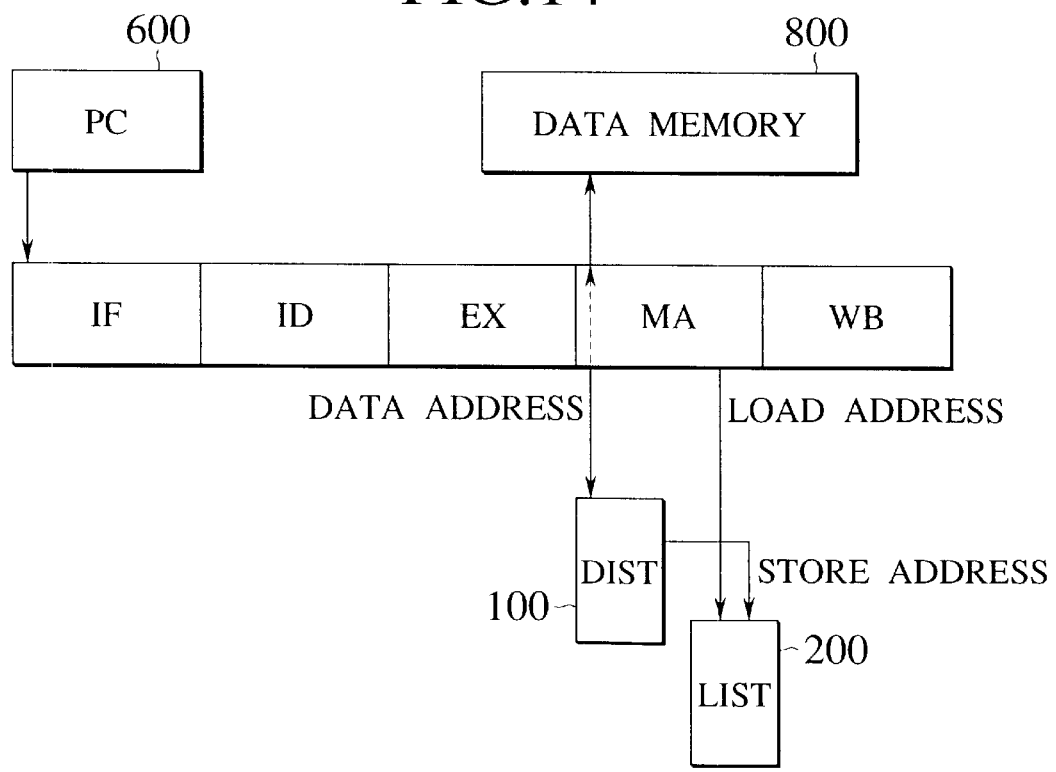
FIG. 14 is a diagram showing a registering operation onto LIST of the data providing unit when the load instruction is executed for the first time.

As shown in FIG. 13, when the store instruction has been completed, registering onto the DIST 100 and the SIVT 300 is always executed. Since all the store instruction address, the data address, and the data necessary for the registering operation are prepared when the store instruction has been completed, registering can be-carried out. If the store instruction address to be expected has not been held in the LIST 200, i.e., if the store instruction address corresponding to the load instruction address has not been held when the load instruction is to be executed, then the registering onto the LIST 200 is carried out when the load instruction has been completed, as shown in FIG. 14. The data address to be accessed has already been calculated when the load instruction has been completed. The data providing controller 700 accesses the DIST 100 by using the data address. Registering onto the LIST 200 is executed with the use of the store instruction address being fetched from the DIST 100 and the load instruction address.

Next, the operation of the first embodiment will be explained in more detail along with a series of instruction sequences with reference to FIGS. 15 and 16 hereunder.

Figure 15:
FIG. 15 is a diagram showing an example of instruction sequence to be processed, in order to illustrate the registering operation of the data providing unit of the present invention.
Figure 16:
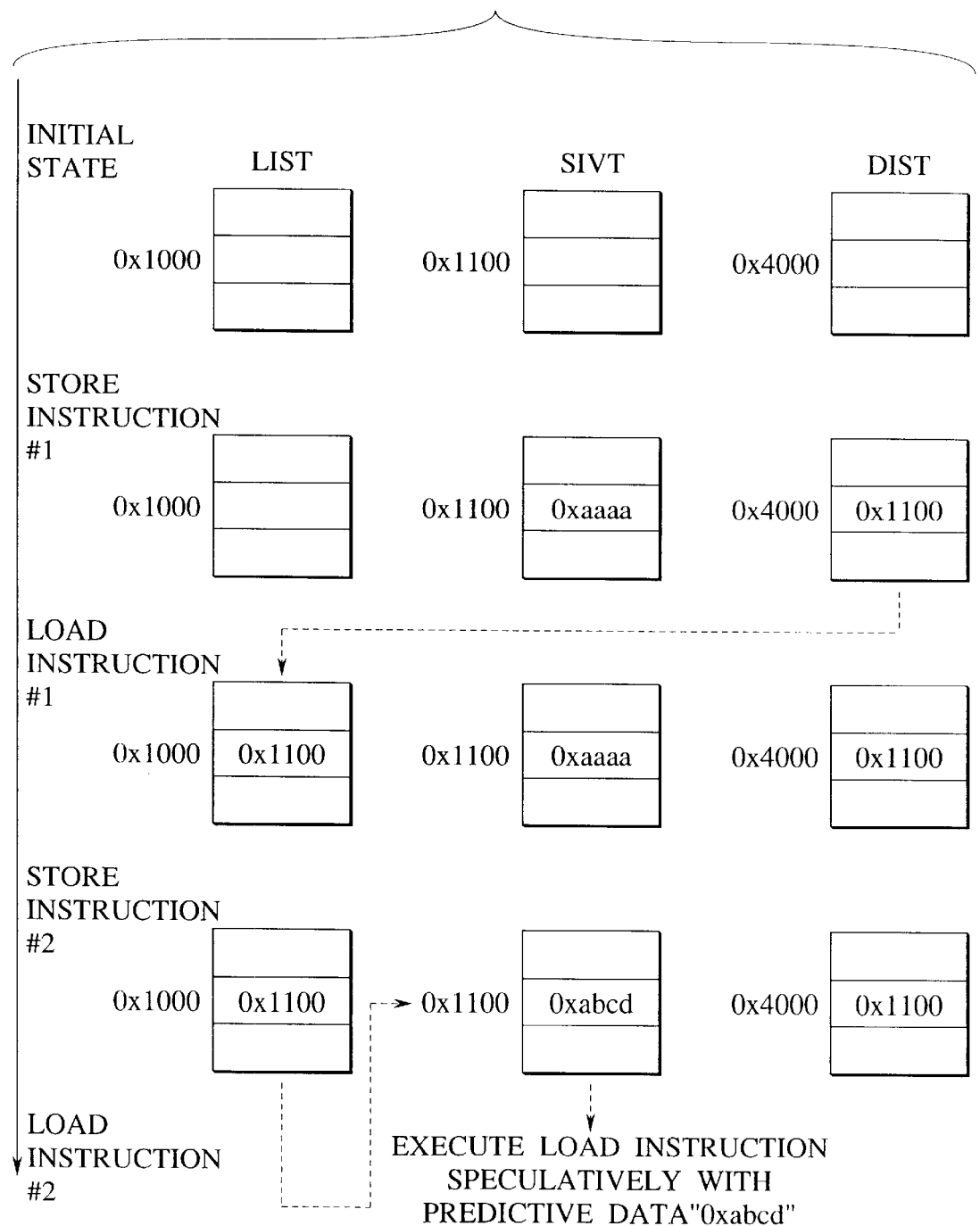
FIG. 16 is a diagram showing an example of the registering operation onto respective tables when the store instruction and the load instruction are executed for the first time and also executed successively.

Assume that the instruction sequence shown in FIG. 15 is given to the first embodiment. Assume that the instruction address of the store instruction is "0x1100", and the instruction address of the load instruction is "0x1000". Also, assume that "0x4000" is stored in both registers r1 and r2. As shown in FIG. 16, not any entry has been registered yet in initial states of the DIST 100, the LIST 200, and the SIVT 300.

When the store instruction is executed in a processing loop shown in FIG. 15 for the first time, values are stored in the SIVT 300 and the DIST 100 respectively. If the value of the register r11 serving as an operand of the store instruction is assumed as "0xaaaa", the "0xaaaa" as the value of the register r11 is registered into a corresponding entry of "0x1100" in the SIVT, as shown in FIG. 16. On the contrary, the address "0x1100" of the store instruction is stored in the entry of "0x4000" as the data store destination address (=r1+0) of the store instruction in the DIST 100.

When the load instruction is executed for the first time, the correspondence between the store instruction and the load instruction is not clear. Nothing has been registered yet onto the corresponding entry of "0x1000" in the LIST 200. Hence, data prediction is not executed. At that time, in the first embodiment, the entry "0x4000" of the DIST 100 corresponding to the data address (r2+0) serving as the operand of the load instruction is accessed. As shown in FIG. 16, the address "0x1100" of the store instruction can be fetched from the entry "0x4000". In the first embodiment, "0x1100" is registered onto the corresponding entry of "0x1000" in the LIST 200. The correspondence between the store instruction and the load instruction is indicated employing this entry of the LIST 200.

Then, when the store instruction is executed for the second time, the DIST 100 and the SIVT 300 are updated. As shown in FIG. 16, the value of the new register r11 is held in the corresponding entry of "0x1100" in the SIVT 300. Assume that "0xabcd" has been registered in FIG. 16.

When the load instruction is executed for the second time, "0x1100" as the address of the corresponding store instruction can be fetched by accessing the LIST 200 first in the first embodiment. The corresponding entry of the SIVT 300 is looked up by using this address. As shown in FIG. 16, the data value "0xabcd" can be fetched from the entry of "0x1100". This data value can be regarded as predictive data. In the first embodiment, the load instruction and succeeding instructions are executed speculatively by using the value of "0xabcd".

According to the first embodiment, following effects can be achieved. Namely, by using the LIST 200 and the SIVT 300, the data providing controller 700 predicts the data value which is to be read from the memory by the load instruction acting as the data transfer instruction by looking up the past histories in above tables accumulated up to now before data address calculation has been completed. Succeeding instructions can be executed speculatively by using this predicted value.

In the first embodiment, if the store instruction and the load instruction are associated with each other, the data being held previously in the table are provided. Accordingly, the instruction can be executed not to wait address calculation of the data.

According to the first embodiment, the data to be read can be looked up using the load instruction address without calculation of the data address according to the load instruction. Therefore, a parallel process efficiency of the pipeline process can be improved and thus process performances of the processor can be improved.

Second Embodiment

Next, as for a processor data providing unit and a processor according to a second embodiment of the present invention, only differences of the second embodiment from the first embodiment will be explained in detail with reference to FIGS. 17 to 20 mainly.

The second embodiment has a configuration which holds the corresponding data address in the entry of the LIST 200.

Figure 19:
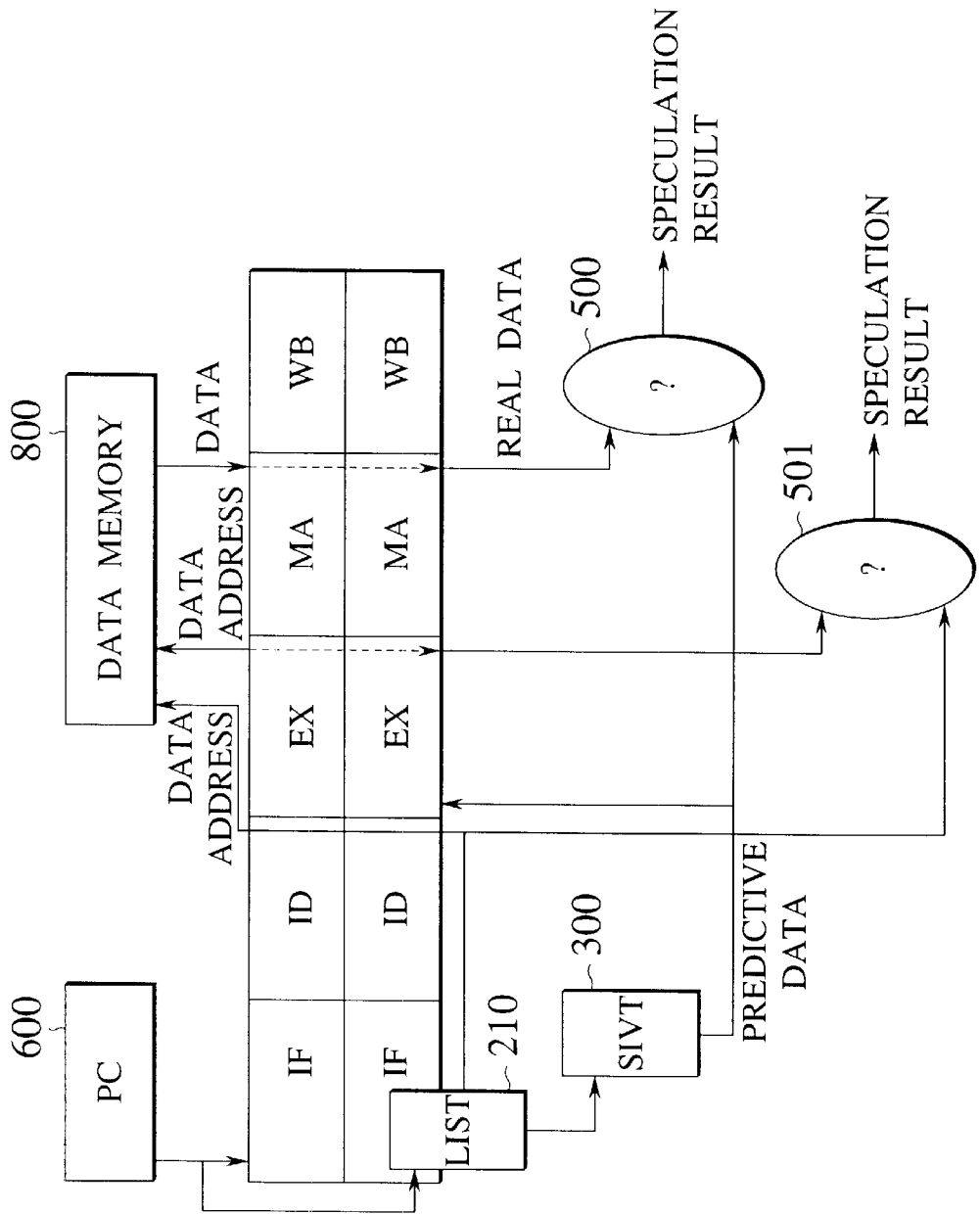
FIG. 19 is a diagram showing a predicting operation of data to be loaded in the data supply unit according to the second embodiment of the present invention in instruction execution.

As shown in FIG. 4, the data providing unit 10 of a processor according to the second embodiment comprises: a DIST (Data Index Storing Table) 100 for storing correspondences between data addresses to be accessed and instruction addresses of the store instruction; a LIST (Load Index Storing Table) 200 for storing correspondences between instruction addresses of the load instruction and instruction addresses of the store instruction; a SIVT (Store Index Value Table) 300 for storing correspondences between the instruction addresses of the store instruction and data values; a processor state holding unit 400 for holding states of the processor before the data providing unit 10 supplies predictive data for the processor; the comparator 500 for comparing the predictive data with the data which can be fetched by actually accessing the memory, so as to output the compared result; and a data providing controller 700 for providing the predictive data which can be retrieved by accessing above respective tables for the processor. Since a configuration of the second embodiment other than the LIST 200 is similar to the first embodiment, its explanation is omitted. However, as shown in FIG. 19, the second embodiment further comprises a comparator 501. In the second embodiment, the LIST 200 in the first embodiment is explained as a LIST 210 in order to distinguish the LIST 210 from that in the first embodiment hereinafter.

In the second embodiment, three tables are constructed similarly to the cache memory. In the second embodiment, respective tables will also be explained under the assumption that they are constructed as the direct map system of an associativity 1. However, no restriction is imposed on the associativity of the tables in the second embodiment, and thus any value may be adopted as the associativity. The tables may be constructed according to the associative system.

Configurations of the DIST 100 and the SIVT 300 are the same as the first embodiment and. therefore their explanation will be omitted.

The LIST 210 in the second embodiment is indexed by the instruction address of the load instruction, and which hold the instruction address of the store instruction corresponding to the load instruction. The LIST 210 corresponds to a second address converter set forth in claims.

Figure 17:
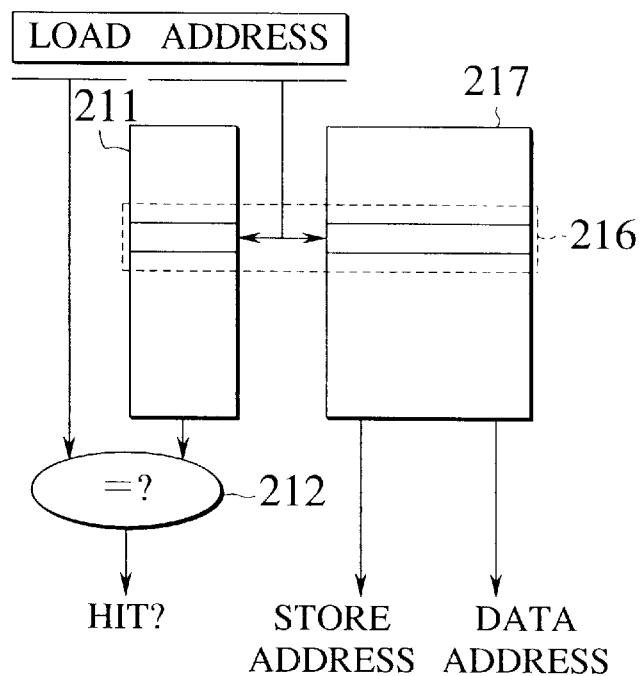
FIG. 17 is a block diagram showing a configuration of LIST in the data providing unit according to a second embodiment of the present invention.

FIG. 17 shows a configuration of the LIST 210. In FIG. 17, the LIST 210 comprises: a tag array 211; a data array 217; and a comparator 212. The data providing controller 700 selects a particular entry 216 of the LIST 210 by using the load instruction address. The comparator 212 compares the tag fetched from the tag array 211 with the upper bit of the load instruction address. If they coincides with each other, the store instruction address fetched from the data array 217 and the data address are regarded to be valid.

Figure 18:
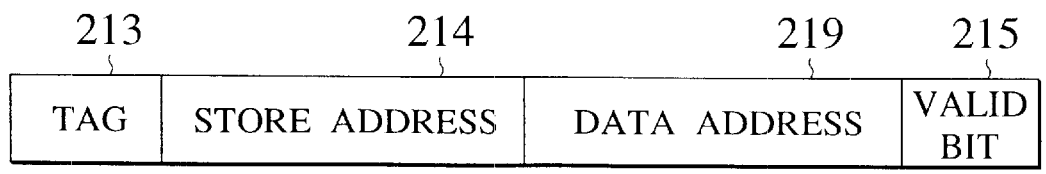
FIG. 18 is a diagram showing respective fields in entry of LIST in FIG. 17.

FIG. 18 shows an entry 216 of the LIST 210 in FIG. 17. In FIG. 18, the entry 216 comprises a tag field 213, an instruction address field 214 of the store instruction, a data address field 219, and a valid bit 215. Each entry in the LIST 210 is selected by the lower bits of the load instruction address whose number correspond to the number of entry of the instruction address of the load instruction. Remaining upper bits of the load instruction address are saved in the tag field 213. If the content of the tag field 213 being saved in the selected entry 216 and the upper bit of the load instruction address coincide with each other when they are compared, the store instruction address corresponding to the load instruction address is held. The address of the store instruction which previously stores the data to be looked up by the given load instruction is held in the store instruction address field 214. Further, in the second embodiment, the data addresses in which the data stored in the memory are held in the data address field 219. The valid bit 215 represents whether or not the entry 216 is valid. When the processor is started, all the valid bits 215 represents the value indicating being invalid as its initial value. When the data are saved in respective entries 216 of the LIST 210, the valid bit 215 is set to valid.

Then, an operation of the second embodiment along with the pipeline operation of the processor and operations of respective tables will be explained hereinbelow.

(1) Table looking-up operation

At first, looking-up operations of the tables in instruction execution will be explained with reference to FIG. 19 hereunder.

As shown in FIG. 19, the data providing controller 700 accesses the LIST 210 in the IF stage by using the load instruction address indicated by the program counter (PC) 600. The data providing controller 700 accesses the SIVT 300 by using the store instruction address which can be fetched from the LIST 210. The data fetched from the SIVT 300 are provided for succeeding instructions as the operand. The data providing controller 700 can provide the data fetched from the SIVT 300 as predictive data before calculation of the data address of the load instruction has been completed. Hence, execution of the succeeding instructions is never interrupted. In this manner, the succeeding instructions can be executed speculatively by using the data predicted from the LIST 210 and the SIVT 300.

In the second embodiment, unless desired data are saved in the SIVT 300, the data providing controller 700 accesses speculatively the data memory 800 by using the data address fetched from the LIST 210. If the data memory 800 can operate at a sufficiently high speed, the data can be provided for the processor without interruption of the execution of the succeeding instructions.

In the MA stage of the load instruction, real data can be fetched from the data memory 800. The comparator 500 compares the real data with the data (predictive data) being fetched from the SIVT 300. If both data coincide with each other, speculative execution is successful. Unless both data coincide with each other, speculative execution is unsuccessful. In the case of unsuccessful execution, the processor must restore the state before the speculative operation is started. In this restoration of the state, for example, the above reorder buffer may be employed.

If the data providing controller 700 has accessed speculatively the data memory 800, it is decided in the EX stage whether or not the speculative execution has been successful when the actual data address is calculated. As shown in FIG. 19, a comparator 501 compares the data address employed in speculative access and the calculated data address. Then, if the compared results coincide with each other, it can be considered that the speculative execution has been successful. On the contrary, unless the compared results coincide with each other, it can be seemed that the speculative execution has been unsuccessful. In this case, the data providing controller 700 causes the state holding unit 400 to restore the state of the processor into the state prior to start of the speculative execution. The above reorder buffer, etc. may be employed to restore the state.

(2) Table registering operation

Second, registering operations onto respective tables will be explained hereunder.

Figure 20:
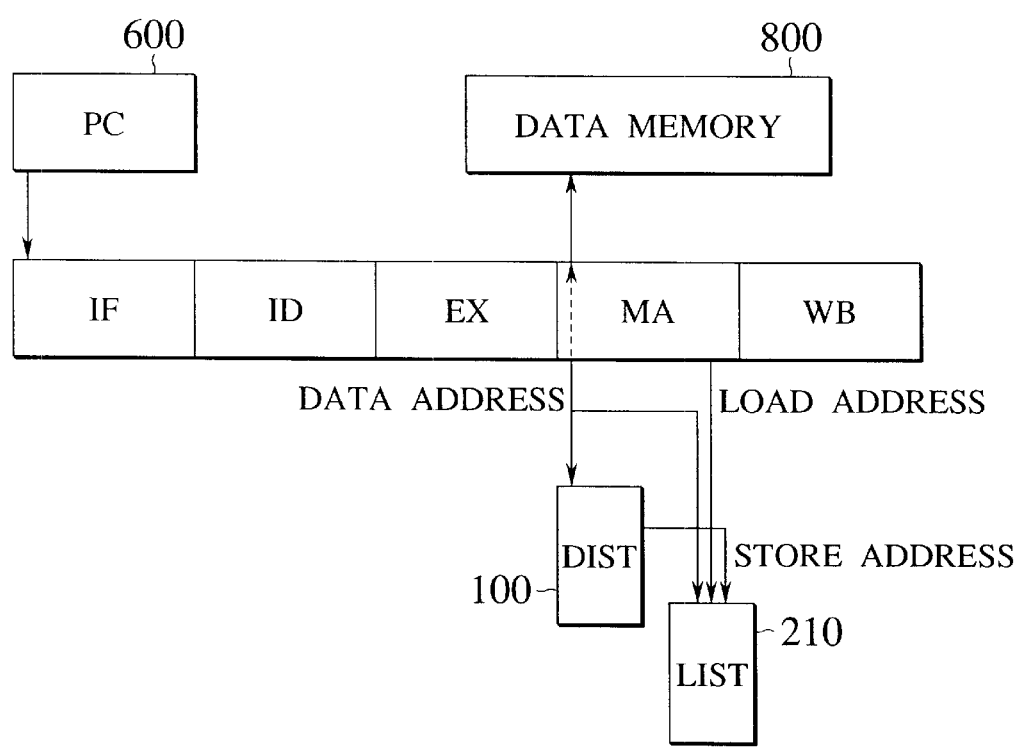
FIG. 20 is a diagram showing a registering operation onto LIST of the data providing unit when the load instruction is executed for the first time.

Registering onto the DIST 100 and the SIVT 300 is executed in the same way as the first embodiment. Since all the store instruction address, the data address, and the data which are necessary for the registering operation are prepared when the store instruction has been completed, registering can be carried out. Unless the store instruction address to be expected has been held in the LIST 210 when the load instruction is to be executed, then the registering onto the LIST 210 is carried out when the load instruction has been completed, as shown in FIG. 20. The data address to be accessed has already been calculated when the load instruction has been completed. The data providing controller 700 accesses the DIST 100 by using the data address. Registering onto the LIST 210 is executed with the use of the store instruction address being fetched from the DIST 100, the load instruction address, and the data address.

According to the second embodiment, in addition to the first embodiment, following effects can be achieved. More particularly, unless desired data have been registered in the SIVT 300, predictive data cannot be obtained in the first embodiment. Therefore, it is impossible to execute the speculative operation. In contrast, in the second embodiment, the predictive data can be obtained by accessing the data memory 800 with the use of predictive data addresses in the LIST 210. For this reason, in the second embodiment, the speculative execution of the succeeding instructions can be performed in above situation.

On the contrary, since the data address field 219 is necessary in the LIST 210, the hardware is increased in size by this field. Accordingly, if it is desired to reduce the hardware configuration in size, the first embodiment is more preferable than the second embodiment.

Third Embodiment

Next, as with a data providing unit for processor and a processor according to a third embodiment of the present invention, only differences of the third embodiment from the first and second embodiments will be explained in detail with reference to FIGS. 21 to 23 mainly.

The third embodiment has a configuration which holds further the data address corresponding to the data in the entry of the SIVT 300.

As shown in FIG. 4, the data providing unit 10 of a processor according to the third embodiment comprises: a DIST (Data Index Storing Table) 100 for storing correspondences between data addresses to be accessed and instruction addresses of the store instruction; a LIST (Load Index Storing Table) 200 for storing correspondences between instruction addresses of the load instruction and instruction addresses of the store instruction; a SIVT (Store Index Value Table) 300 for storing correspondences between the instruction addresses of the store instruction and data values; a state holding unit 400 for holding states of the processor before the data providing unit 10 provides predictive data for the processor; a comparator 500 for comparing the predictive data with the actual data which can be fetched by actually accessing the memory, so as to output the compared result, and a data providing controller 700 for providing the predictive data which can be retrieved by accessing above respective tables for the processor. Since a configuration of the third embodiment other than the SIVT 300 is similar to the first embodiment, its explanation is omitted. However, in the third embodiment, the comparator 500 provided in the first embodiment is not needed, but the comparator 510 employed in the second embodiment is provided. In the third embodiment, the SIVT 300 in the above embodiments is explained as a SIVT 310 in order to distinguish the SIVT 310 from those in the above embodiments hereinafter.

In the third embodiment, three tables are constructed similarly to the cache memory. In the third embodiment, respective tables will also be explained under the assumption that they are constructed as the direct map system of an associativity 1. However, no restriction is imposed on the associativity of the tables in the third embodiment, and thus any value may be taken as the associativity. Respective tables may be constructed according to the associative system.

Configurations of the DIST 100 and the LIST 200 are the same as the first embodiment and therefore their explanation will be omitted.

The SIVT 310 in the third embodiment is indexed by the instruction address of the store instruction, and which hold the data stored by the store instruction and the data address. The SIVT 310 corresponds to a data storing unit set forth in claims.

Figure 21:
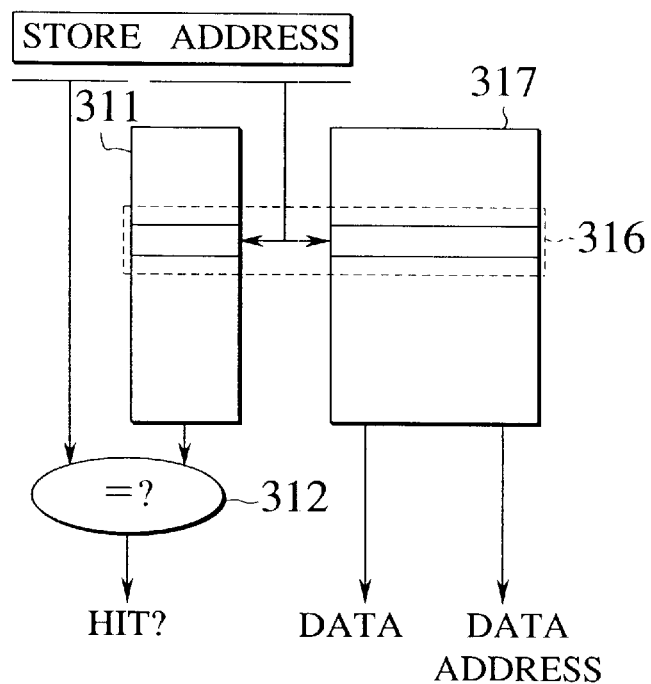
FIG. 21 is a block diagram showing a configuration of SIVT in the processor data providing unit according to a third embodiment of the present invention.

FIG. 21 shows a configuration of the SIVT 310. In FIG. 21, the SIVT 310 comprises: a tag array 311; a data array 317; and a comparator 312. The data providing controller 700 selects a particular entry 316 of the SIVT 310 by using the store instruction address. The comparator 312 compares the tag fetched from the tag array 311 with the upper bit of the store instruction address. If they coincides with each other, the store instruction address fetched from the data array 317 is regarded to be valid.

Figure 22:
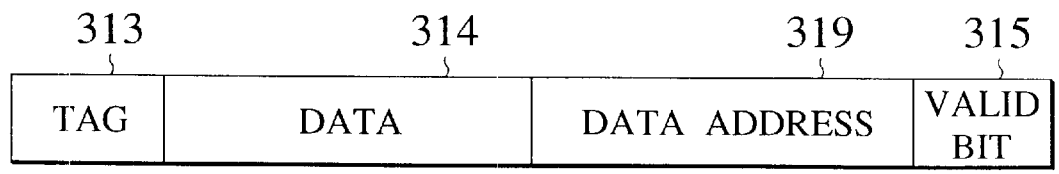
FIG. 22 is a diagram showing respective fields in entry of SIVT in FIG. 21.

FIG. 22 shows an entry 316 of the SIVT 310 in FIG. 21. In FIG. 22, the entry 316 comprises: a tag field 313; a data field 314; a data address field 319; and a valid bit 315. The SIVT 310 is selected by the lower bits of the store instruction address whose number correspond to the number of entry of the instruction address of the store instruction. Remaining upper bits of the store instruction address are saved in the tag field 313. If the content of the tagfield 313 being saved in the selected entry 316 and the upper bit of the store instruction address coincide with each other when they are compared, the data corresponding to the store instruction address and the data address are held. The data which are stored previously by the store instruction is held in the data field 314. In the third embodiment, further the data addresses in which the data stored in the memory are held in the data address field 319. The valid bit 315 represents whether or not the entry 316 is valid. When the processor is started, all the valid bit 315 represent the value indicating being invalid as its initial value. When the data are saved in respective entries 316 of the SIVT 310, the valid bit 315 is set to valid.

Next, an operation of the third embodiment along with a pipeline operation of the processor and operations of respective tables will be explained hereinbelow.

(1) Table looking-up operation

First, looking-up operations of the tables in instruction execution will be explained with reference to FIG. 23 hereunder.

Figure 23:
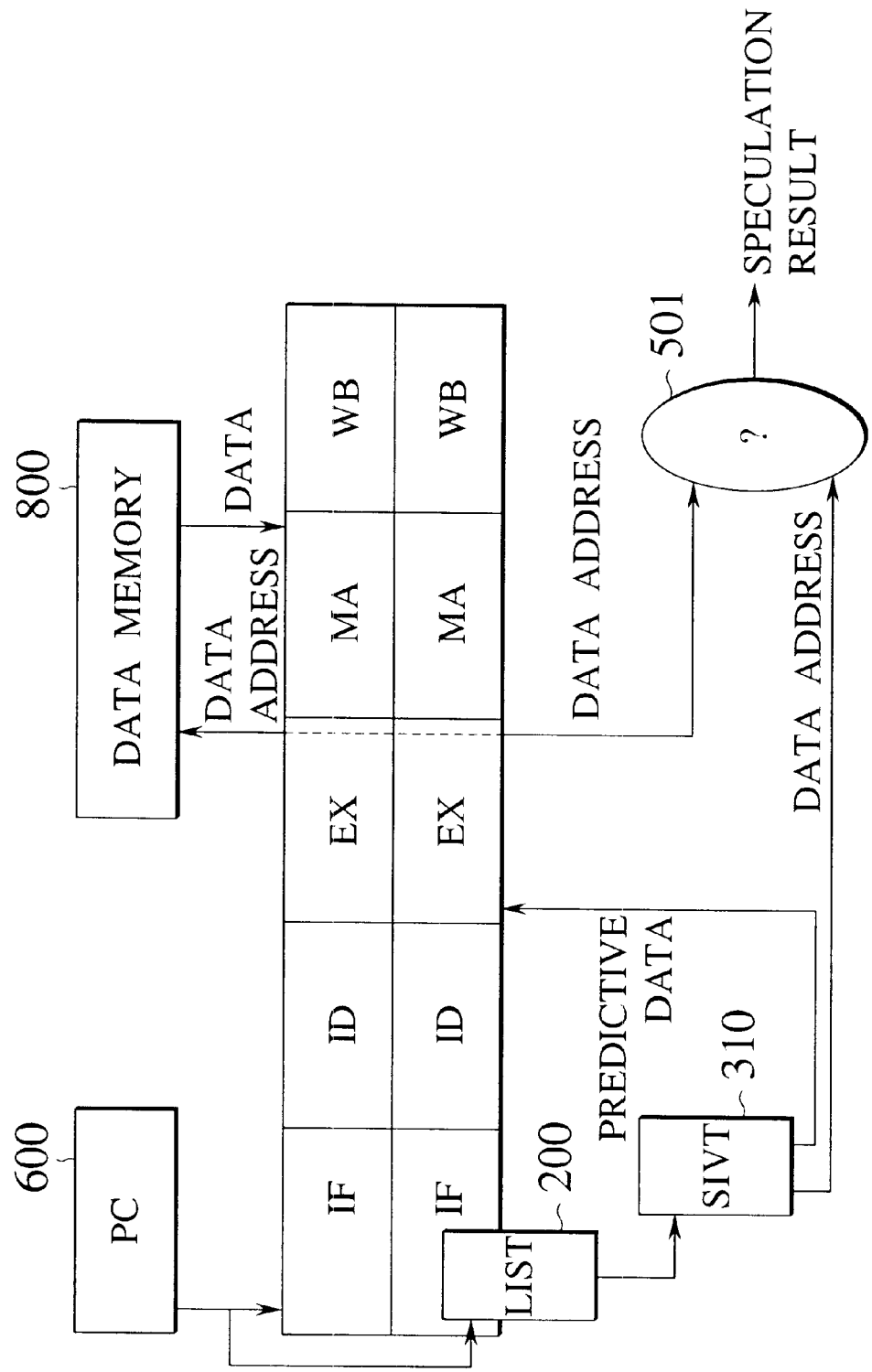
FIG. 23 is a diagram showing a configuration of a data providing unit according to the third embodiment of the present invention and a predicting operation of data to be loaded in instruction execution.

As shown in FIG. 23, the data providing controller 700 accesses the LIST 200 in the IF stage by using the load instruction address indicated by the program counter (PC) 600. The data providing controller 700 accesses the SIVT 310 by using the store instruction address which can be fetched from the LIST 200. The data fetched from the SIVT 310 are provided for succeeding instructions as the operand. The data providing controller 700 can provide the data fetched from the SIVT 310 as predictive data before calculation of the data address of the load instruction has been completed. Hence, execution of the succeeding instructions is never interrupted. In this manner, the succeeding instructions can be executed speculatively by using the data predicted from the LIST 200 and the SIVT 310.

In the EX stage of the load instruction, the data address is calculated. In the third embodiment, the comparator 501 compares the calculated data address with the data (predictive data) address being fetched from the SIVT 310 at this time. If both data coincide with each other, speculative execution is successful. Unless both data coincide with each other, speculative execution is unsuccessful. In the case of unsuccessful execution, the state of the processor must restore the state before the speculative operation is started. In this restoration of the state, for example, the above reorder buffer may be employed.

(2) Table registering operation

Since registering operations onto respective tables are similar to those in the above embodiments, their explanation is omitted.

According to the third embodiment, in addition to the first and second embodiments, following effects can be achieved. More particularly, in the above embodiments, the decision whether or not the speculative operation has been successful cannot be performed until the operation comes up to the MA stage of the load instruction. In contrast, in the third embodiment, such decision whether or not the speculative operation has been successful can be performed in the EX stage. If the speculative operation has succeeded, no difference in the process efficiency between the third embodiment and the above embodiments is caused. However, if the speculative operation has failed, the state of the processor can be restored more quickly in the third embodiment than the above embodiments. For this reason, process performances can be improved in the third embodiment, nevertheless the hardware is increased in size by the data address field 319 since this field is needed in the SIVT 310. Accordingly, if it is desired to reduce the hardware configuration in size, the above embodiments are more preferable than the third embodiment.

Fourth Embodiment

Next, concerning a data providing unit for processor and a processor according to a fourth embodiment of the present invention, merely differences of the fourth embodiment from the above embodiments will be explained in detail with reference to FIG. 24 mainly.

The fourth embodiment has a configuration in which the second embodiment and the third embodiment are employed in combination.

As shown in FIG. 4, the data providing unit 10 of a processor according to the fourth embodiment comprises: a DIST (Data Index Storing Table) 100 for storing correspondences between data addresses to be accessed and instruction addresses of the store instruction; a LIST (Load Index Storing Table) 200 for storing correspondences between instruction addresses of the load instruction and instruction addresses of the store instruction; a SIVT (Store Index Value Table) 300 for storing correspondences between the instruction addresses of the store instruction and data values; a state holding unit 400 for holding states of the processor before the data providing unit 10 provides predictive data for the processor; a comparator 500 for comparing the predictive data with the actual data which can be fetched by actually accessing the memory, so as to output the compared result, and a data providing controller 700 for providing the predictive data which can be fetched by accessing above respective tables for the processor. Since a configuration of the fourth embodiment is similar to the second and third embodiments, its explanation is omitted. However, as shown in FIG. 24, a multiplexer 502 is provided in the fourth embodiment in addition to the configurations of the above embodiments. In the fourth embodiment, the DIST 100 is identical to the DIST 100 shown in FIGS. 6 and 7 in the first embodiment. The LIST 210 is identical to the LIST 210 shown in FIGS. 17 and 18 in the second embodiment. The SIVT 310 is identical to the SIVT 310 shown in FIGS. 21 and 22 in the third embodiment.

In the fourth embodiment, three tables are constructed similarly to the cache memory. In the fourth embodiment, explanation will be made under the assumption that respective tables are constructed as the direct map system of an associativity 1. However, no restriction is imposed on the associativity of the tables in the fourth embodiment, and thus any value may be taken as the associativity. Respective tables may be constructed according to the associative system.

Then, an operation of the fourth embodiment along with the pipeline operation of the processor and operations of respective tables will be explained hereinbelow.

(1) Table looking-up operation

First, looking-up operations of the tables in instruction execution will be explained with reference to FIG. 24 hereunder.

Figure 24:
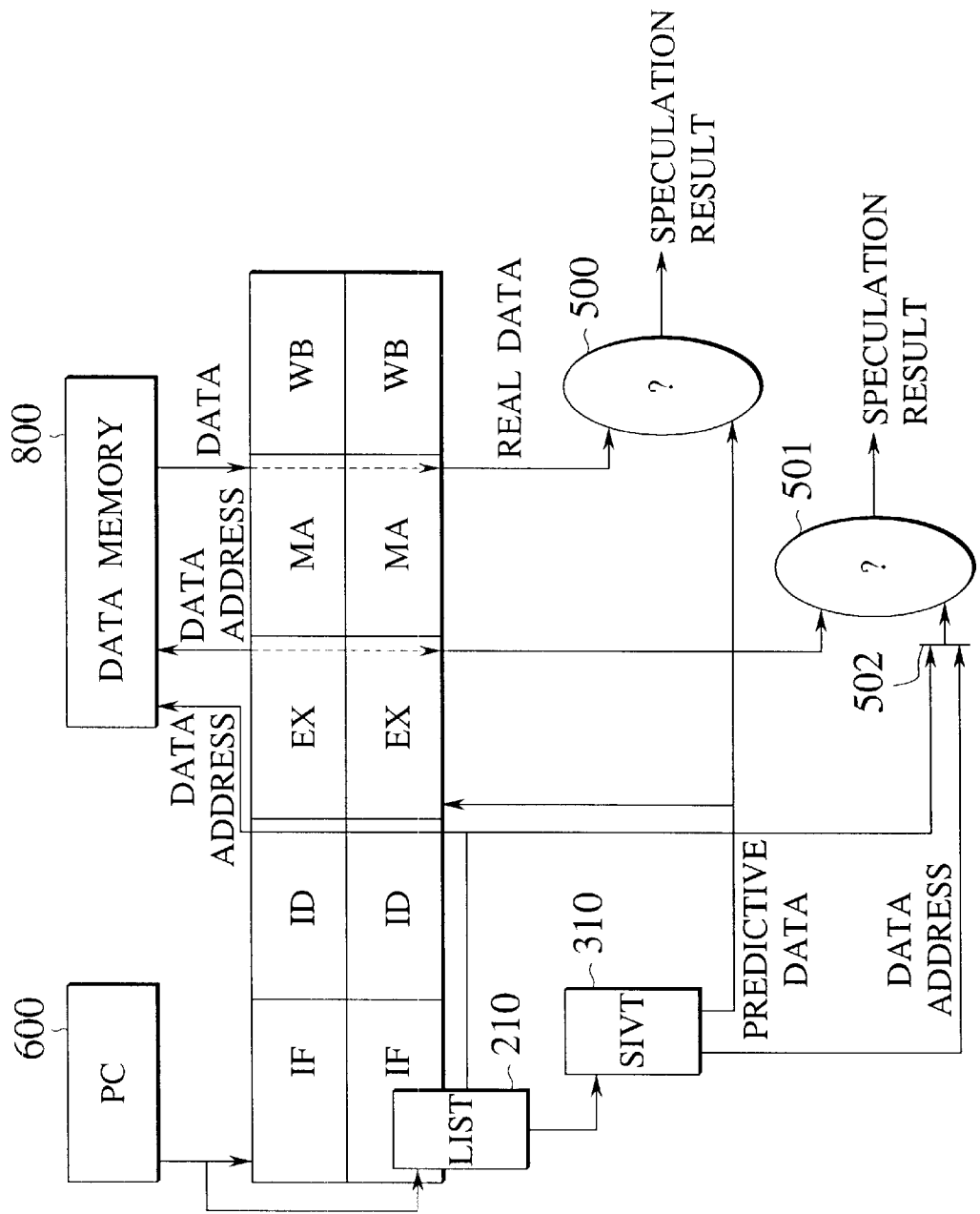
FIG. 24 is a diagram showing a configuration of a data providing unit according to a fifth embodiment of the present invention and a predicting operation of data to be loaded.

As shown in FIG. 24, the data providing controller 700 accesses the LIST 210 in the IF stage by using the load instruction address indicated by the program counter (PC) 600. The data providing controller 700 accesses the SIVT 310 by using the store instruction address which can be fetched from the LIST 210. The data fetched from the SIVT 310 are provided for succeeding instructions as the operand. The data providing controller 700 can provide the data fetched from the SIVT 310 as predictive data before calculation of the data address of the load instruction has been completed. Hence, execution of the succeeding instructions is in no way interrupted. In this manner, the succeeding instructions can be executed speculatively by using the data predicted from the LIST 210 and the SIVT 310.

In the fourth embodiment, unless desired data are saved in the SIVT 310, the data providing controller 700 accesses speculatively the data memory 800 by using the data address fetched from the LIST 210. If the data memory 800 can operate at a sufficiently high speed, the data can be provided for the processor without interruption of the execution of the succeeding instructions.

In the fourth embodiment, in the EX stage of the load instruction, the data addresses are calculated. The comparator 501 compares the calculated data address with the data address being fetched from the SIVT 310. If compared result coincides with each other, speculative execution has been made successfully. Unless the compared result coincide with each other, speculative execution has been made unsuccessfully. In the case of failure, the processor must restore the state before the speculative operation is started. In this restoration of the state, for example, the above reorder buffer may be employed. Unless desired data have been held in the SIVT 310, the multiplexer 502 selects the data address held in the LIST 210. On the contrary, if the desired data have been stored in the SIVT 310, the multiplexer 502 selects the data address stored in the SIVT 310.

Then, in the MA stage of the load instruction, real data can be fetched from the data memory 800. The comparator 500 compares the real data and the data fetched from the SIVT 310 (predictive data). Then, if the compared results coincide with each other, it can be considered that the speculative execution has been successful. In contrast, unless the compared results coincide with each other, it can be seemed that the speculative execution has been unsuccessful. In the unsuccessful case, the state of the processor must be restored into the state before start of the speculative execution. The above reorder buffer, for example, may be employed in this restoring of the state.

(2) Table registering operation

Registering onto the tables in the fourth embodiment is carried out similarly to the above embodiments, and therefore its explanation will be omitted.

According to the fourth embodiment, combined effects of the second embodiment and the third embodiment can be achieved. Therefore, the process efficiency of the processor can be further improved.

Fifth Embodiment

Next, as with a processor data providing unit and a processor according to a fifth embodiment of the present invention, only differences of the fifth embodiment from the above embodiments will be explained in detail with reference to the accompanying drawings hereunder.

A feature of the fifth embodiment resides in that a pipeline stage to access the LIST 200 and a pipeline stage to access the SIVT 300 are provided as different stages.

A configuration of the data providing unit 10 of the processor according to the fifth embodiment is similar to those of the first to third embodiments and therefore its explanation is omitted.

Then, an operation of the fifth embodiment along with the pipeline operation of the processor and operations of respective tables will be explained hereinbelow.

(1) Table looking-up operation

First, looking-up operations of respective tables in instruction execution will be explained hereunder.

The data providing controller 700 accesses the LIST 210 in the IF stage by using the load instruction address indicated by the program counter (PC) 600. While, the data providing controller 700 according to the fifth embodiment accesses the SIVT 300 in the ID stage by using the store instruction address which can be fetched from the LIST 200. The data fetched from the SIVT 300 are provided for the succeeding instructions as the operand. The data providing controller 700 can provide the data fetched from the SIVT 300 as predictive data before calculation of the data address of the load instruction has been completed. Therefore, execution of the succeeding instructions is never interrupted. In this way, the succeeding instructions can be executed speculatively by using the data predicted from the LIST 200 and the SIVT 300.

If the LIST 200 and the SIVT 300 are operated at a low speed, there is a possibility that a cycle time of the processor is extended when these two tables are accessed simultaneously in the IF stage. In contrast, since these two tables are accessed in different stages in the fifth embodiment, the above problem can be overcome. These tables has the same configuration as the cache memory. Therefore, access to these tables does not become slower than access to the cache memory and thus no situation that the cycle time of the processor is extended is caused. On the contrary, if the LIST 200 and the SIVT 300 are operated at a high speed (in case table capacity is sufficiently small, for example), it is desired that the configurations of the above embodiments should be employed.

Next, a first modification of the above embodiments will be explained with reference to FIG. 25 hereunder.

Figure 25:
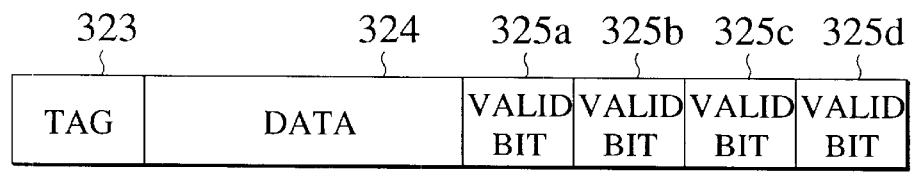
FIG. 25 is a diagram showing a configuration of a first modification wherein valid bits are provided in byte unit to respective entries of DIST of the data providing units according to respective embodiments of the present invention.

The first modification is characterized in that, as shown in FIG. 25, valid bits in respective entries of the SIVT are provided in byte unit in the above embodiments of the present invention. This configuration can deal with the case where a data width handled by the store instruction is smaller than a data width handled by the load instruction. Since the partial valid bits checked by the load instruction has indicated being invalid when the data width in the store instruction is smaller than the data width in the load instruction, the speculative operation which brings about unsuccessful result is not executed.

Then, a second modification of the above embodiments will be explained with reference to FIG. 26 hereunder.

Figure 26:
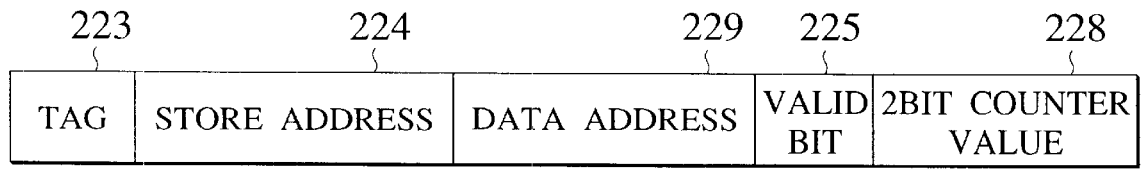
FIG. 26 is a diagram showing a configuration of a second modification wherein a counter field for counting the success number of times of data prediction is provided to respective entries of LIST of the data providing units according to respective embodiments of the present invention.

The second modification is characterized in that, as shown in FIG. 26, a counter field 228 for counting the success number of times of data prediction is provided to respective entries of LIST of the data providing units. Since no restriction is imposed particularly on the bit width of the counter field 228, an example of two bits will be explained herein. The value of the counter field 228 is incremented by 1 when the prediction is made successfully, while the value of the counter field 228 is decremented by 1 when the prediction is made unsuccessfully. If the value of the counter field 228 is in excess of 2, for example, when the LIST is looked up, the speculative operation is executed. However, if not, the speculative operation is not executed. In this second modification, since validity of the speculative operation for the load instruction can be assumed with referring the counter field 228, the inadvertent speculative operation can be suppressed and thus reduction in performances due to the failure of the speculative operation can be prevented.

In a summary, in the data providing unit and the processor having the data providing unit according to the present invention, the value to be read from the memory by the load instruction can be predicted by looking up the past histories being accumulated in the tables up to now before calculation of the data address has been completed. The succeeding instructions can be executed speculatively by using the predicted value.

Accordingly, the instruction can be executed not to wait the address calculation of the data.

Therefore, the parallel process efficiency of the pipeline process can be improved and thus the process performances of the processor can be improved.

Various modifications will become possible for those skilled in the art after receiving the teachings of the present disclosure without departing from the scope thereof. It is intended, therefore, that all matter contained in the foregoing description and in the drawings shall be interpreted as illustrative only not as limitative of the invention.

What is claimed is:

1. A data providing unit for providing data for a processor, comprising:
   a data index storing table for holding a store instruction address indexed by a data address at which data value is stored by the store instruction;
   a load index storing table for holding the store instruction address indexed by a load instruction address, according to a load instruction executed after the store instruction;
   a store index value table for holding data value indexed by the store instruction address, according to the data value stored by the store instruction; and
   a data providing controller for obtaining the store instruction address by referring to the data index storing table and the load index storing table according to the load instruction address indicated by a program counter, obtaining the data value which is employed by the store instruction from the store index value table, and providing the obtained data value for the processor as predictive data which is to be loaded from a memory by the load instruction.

2. The data providing unit of claim 1, further comprising:
   a state holding unit for holding a state of the processor before the processor refers to the predictive data being provided; and
   a first comparator for comparing the predictive data with a data being read from a data memory when the processor fetches the data by accessing the data memory;
   wherein the data providing controller restores the processor to a state which is held in the state holding unit if both data do not coincide with each other.

3. The data providing unit of claim 2, wherein the state holding unit is composed of a reorder buffer.

4. The data providing unit of claim 2, wherein the state held by the state holding unit at least contains content of a register and the program counter.

5. The data providing unit of claim 1, wherein said data index storing table includes,
   a first tag field for judging whether or not given data address coincides with data address of each entry,
   a first store instruction address field for holding address of the store instruction which employs data stored in the data address, and
   a first valid bit for indicating whether or not the address of the store instruction being held is valid,
   said load index storing table includes,
      a second tag field for judging whether or not address of a given load instruction coincides with address of the load instruction of each entry,
      a second store instruction address field for holding address of the store instruction which corresponds to the address of the load instruction, and
      a second valid bit for indicating whether or not the address of the store instruction being held is valid, and
   said store index value table includes,
      a third tag field for judging whether or not address of the store instruction coincides with address of the store instruction of each entry,
      a data field for holding data value which are stored by the store instruction, and
      a third valid bit for indicating whether or not data being held is valid.

6. The data providing unit of claim 2, wherein said data index storing table includes,
   a first tag field for judging whether or not given data address coincides with data address of each entry,
   a first store instruction address field for holding address of the store instruction which employs data stored in the data address and
   a first valid bit for indicating whether or not the address of the store instruction being held is valid,
   said load index storing table includes,
      a second tag field for judging whether or not address of a given load instruction coincides with address of the load instruction of each entry,
      a second store instruction address field for holding address of the store instruction which corresponds to the address of the load instruction, and
      a second valid bit for indicating whether or not the address of the store instruction being held is valid, and
   said store index value table includes,
      a third tag field for judging whether or not address of the store instruction coincides with address of the store instruction of each entry,
      a data field for holding data value which are stored by the store instruction, and
      a third valid bit for indicating whether or not data being held is valid.

7. The data providing unit of claim 5, wherein the first valid bit of said data index storing table indicates whether or not data being held is valid in byte unit.

8. The data providing unit of claim 6, wherein the first valid bit of said data index storing table indicates whether or not data being held is valid in byte unit.

9. The data providing unit of claim 5, further comprising:
   a counter for holding a counter value which is incremented if data or data addresses coincide with each other in comparison and is decremented if data or data addresses do not coincide with each other in comparison;
   wherein the data providing controller judges based on the counter value in the counter whether or not succeeding instructions are to be executed speculatively by using the data or the data address being obtained from said store index value table.

10. The data providing unit of claim 9, wherein the counter is formed of a counter field provided in said load index storing table.

11. The data providing unit of claim 1, wherein the data providing controller obtains the predictive data by accessing said load index storing table and said store index value table before decoding of a given instruction has been completed.

12. The data providing unit of claim 2, wherein said load index storing table provides data address corresponding to the store instruction being held.

13. The data providing unit of claim 5, wherein said load index storing table further includes an data address field of the data which corresponds to the store instruction being held.

14. The data providing unit of claim 2, wherein said store index value table provides the data address of the data being held.

15. The data providing unit of claim 5, wherein said store index value table further includes a data address field of the data being held.

16. The data providing unit of claim 12, further comprising:
a second comparator for comparing the data address provided from said load index storing table with the data address obtained by calculation when the processor calculates address of the data;
wherein the data providing controller restores the processor to a state being held in the state holding unit unless both addresses coincide with each other.

17. The data providing unit of claim 14, further comprising:
a third comparator for comparing the data address provided from said store index value table with the data address obtained by calculation when the processor calculates address of the data;
wherein the data providing controller restores the processor to a state being held in the state holding unit unless both addresses coincide with each other.

18. The data providing unit of claim 1, wherein the data providing controller looks up said load index storing table in one pipeline stage, and looks up said store index value table in the other pipeline stage respectively.

19. The data providing unit of claim 1, wherein said data providing controller provides the obtained data value from the store index value table for the processor before data address calculation for load instruction is executed.

20. The data providing unit of claim 1, wherein at least one of said data index storing table, said load index storing table and said store index value table is provided in a cache memory.

21. A processor for executing a process by accessing data on a data memory, comprising;
a data index storing table for holding a store instruction address indexed by a data address at which data value is stored by the store instruction;
a load index storing table for holding the store instruction address indexed by a load instruction address, according to a load instruction executed after the store instruction;
a store index value table for holding data value indexed by the store instruction address, according to the data value stored by the store instruction; and
a data providing controller for obtaining the store instruction address by referring to the data index storing table and the load index storing table according to the load instruction address indicated by a program counter, obtaining the data value which is employed by the store instruction from the store index value table, and providing the obtained data value for the processor as predictive data which is to be loaded from a memory by the load instruction.

22. The processor of claim 21, wherein said data index storing table includes,
a first tag field for judging whether or not given data address coincides with data address of each entry,
a first store instruction address field for holding address of the store instruction which employs data stored in the data address, and
a first valid bit for indicating whether or not the address of the store instruction being held is valid,
said load index storing table includes,
a second tag field for judging whether or not address of a given load instruction coincides with address of the load instruction of each entry,
a second store instruction address field for holding address of the store instruction which corresponds to the address of the load instruction, and
a second valid bit for indicating whether or not the address of the store instruction being held is valid, and
said store index value table includes,
a third tag field for judging whether or not address of the store instruction coincides with address of the store instruction of each entry,
a data field for holding data value which are stored by the store instruction, and
a third valid bit for indicating whether or not data being held is valid.

23. A data providing unit for providing data for a processor, comprising:
a first address converter for holding an address of a store instruction corresponding to data address, based on execution history of the store instruction;
a second address converter for holding the address of the store instruction corresponding to an address of a load instruction, based on execution history of the load instruction;
a data storing unit for holding data corresponding to the address of the store instruction, based on execution history of the store instruction; and
a data providing controller for retrieving the load instruction and the store instruction, both instructions looking up a same data address, from the first address converter and the second address converter, and retrieving data which are employed by the store instruction corresponding to the load instruction, from the data storing unit, based on the address of the load instruction, and providing the obtained data for the processor as predictive data to which access by the load instruction is predicted,
wherein the first address converter includes,
a first tag field for judging whether or not given data address coincides with data address of each entry,
a first store instruction address field for holding address of the store instruction which employs data stored in the data address, and
a first valid bit for indicating whether or not the address of the store instruction being held is valid,
the second address converter includes,
a second tag field for judging whether or not address of a given load instruction coincides with address of the load instruction of each entry,
a second store instruction address field for holding address of the store instruction which corresponds to the address of the load instruction, and
a second valid bit for indicating whether or not the address of the store instruction being held is valid, and
the data storing unit includes,
a third tag field for judging whether or not address of the store instruction coincides with address of the store instruction of each entry,
a data field for holding data value which are stored by the store instruction, and
a third valid bit for indicating whether or not data being held is valid.

24. A data providing unit for providing data for a processor, comprising:
a first address converter for holding an address of a store instruction corresponding to data address, based on execution history of the store instruction;
a second address converter for holding the address of the store instruction corresponding to an address of a load instruction, based on execution history of the load instruction;

a data storing unit for holding data corresponding to the address of the store instruction, based on execution history of the store instruction;

a data providing controller for retrieving the load instruction and the store instruction, both instructions looking up a same data address, from the first address converter and the second address converter, and retrieving data which are employed by the store instruction corresponding to the load instruction, from the data storing unit, based on the address of the load instruction, and providing the obtained data for the processor as predictive data to which access by the load instruction is predicted;

a state holding unit for holding a state of the processor before the processor refers to the predictive data being provided; and a first comparator for comparing the predictive data with a data being read from a data memory when the processor fetches the data by accessing the data memory, wherein the data providing controller restores the processor to a state which is held in the state holding unit if both data do not coincide with each other, wherein the first address converter includes,
  a first tag field for judging whether or not given data address coincides with data address of each entry,
  a first store instruction address field for holding address of the store instruction which employs data stored in the data address, and
  a first valid bit for indicating whether or not the address of the store instruction being held is valid,
the second address converter includes,
  a second tag field for judging whether or not address of a given load instruction coincides with address of the load instruction of each entry,
  a second store instruction address field for holding address of the store instruction which corresponds to the address of the load instruction, and
  a second valid bit for indicating whether or not the address of the store instruction being held is valid, and
the data storing unit includes,
  a third tag field for judging whether or not address of the store instruction coincides with address of the store instruction of each entry,
  a data field for holding data value which are stored by the store instruction, and
  a third valid bit for indicating whether or not data being held is valid.

25. A data providing unit for providing data for a processor, comprising:

a first address converter for holding an address of a store instruction corresponding to data address, based on execution history of the store instruction;

a second address converter for holding the address of the store instruction corresponding to an address of a load instruction, based on execution history of the load instruction;

a data storing unit for holding data corresponding to the address of the store instruction, based on execution history of the store instruction;

a data providing controller for retrieving the load instruction and the store instruction, both instructions looking up a same data address, from the first address converter and the second address converter, and retrieving data which are employed by the store instruction corresponding to the load instruction, from the data storing unit, based on the address of the load instruction, and providing the obtained data for the processor as predictive data to which access by the load instruction is predicted;

a state holding unit for holding a state of the processor before the processor refers to the predictive data being provided;

a first comparator for comparing the predictive data with a data being read from a data memory when the processor fetches the data by accessing the data memory; and a second comparator for comparing the data address obtained by the second address converter with the data address obtained by calculation when the processor calculates address of the data, wherein the data providing controller restores the processor to a state which is held in the state holding unit if both data do not coincide with each other, wherein the second address converter provides data address corresponding to the store instruction being held, and wherein the data providing controller restores the processor to a state being held in the state holding unit unless both addresses coincide with each other.

26. A data providing unit for providing data for a processor, comprising:

a first address converter for holding an address of a store instruction corresponding to data address, based on execution history of the store instruction;

a second address converter for holding the address of the store instruction corresponding to an address of a load instruction, based on execution history of the load instruction;

a data storing unit for holding data corresponding to the address of the store instruction, based on execution history of the store instruction;

a data providing controller for retrieving the load instruction and the store instruction, both instructions looking up a same data address, from the first address converter and the second address converter, and retrieving data which are employed by the store instruction corresponding to the load instruction, from the data storing unit, based on the address of the load instruction, and providing the obtained data for the processor as predictive data to which access by the load instruction is predicted;

a state holding unit for holding a state of the processor before the processor refers to the predictive data being provided;

a first comparator for comparing the predictive data with a data being read from a data memory when the processor fetches the data by accessing the data memory; and a second comparator for comparing the data address provided from the data storing unit with the data address obtained by calculation when the processor calculates address of the data, wherein the data storing unit provides the data address of the data being held, and wherein the data providing controller restores the processor to a state being held in the state holding unit unless both addresses coincide with each other.

27. A processor for executing a process by accessing data on a data memory, comprising;
- a first address converter for holding an address of a store instruction corresponding to data address, based on execution history of the store instruction;
- a second address converter for holding the address of the store instruction corresponding to an address of a load instruction, based on execution history of the load instruction;
- a data storing unit for holding data corresponding to the address of the store instruction, based on execution history of the store instruction; and
- a data providing controller for retrieving the load instruction and the store instruction, both instructions looking up a same data address, from the first address converter and the second address converter, and retrieving data which are employed by the store instruction corresponding to the load instruction, from the data storing unit, based on the address of the load instruction and providing the obtained data for the processor as predictive data to which access by the load instruction is predicted, wherein the first address converter includes,
- a first tag field for judging whether or not given data address coincides with data address of each entry,
- a first store instruction address field for holding address of the store instruction which employs data stored in the data address, and
- a first valid bit for indicating whether or not the address of the store instruction being held is valid, the second address converter includes,
- a second tag field for judging whether or not address of a given load instruction coincides with address of the load instruction of each entry,
- a second store instruction address field for holding address of the store instruction which corresponds to the address of the load instruction, and
- a second valid bit for indicating whether or not the address of the store instruction being held is valid, and the data storing unit includes,
- a third tag field for judging whether or not address of the store instruction coincides with address of the store instruction of each entry,
- a data field for holding data value which are stored by the store instruction, and
- a third valid bit for indicating whether or not data being held is valid.

* * * * *